United States Patent
McLauchlan et al.

(10) Patent No.: US 9,294,822 B2
(45) Date of Patent: Mar. 22, 2016

(54) PROCESSING AND APPARATUS FOR ADVERTISING COMPONENT PLACEMENT UTILIZING AN ONLINE CATALOG

(71) Applicant: MirriAd Advertising Limited, London (GB)

(72) Inventors: Philip McLauchlan, London (GB); Mark Popkiewicz, London (GB); Simon Cuff, London (GB); Julien Fauqueur, London (GB)

(73) Assignee: MIRRIAD ADVERTISING LIMITED, London (GB)

( * ) Notice: Subject to any disclaimer, the term of this patent is extended or adjusted under 35 U.S.C. 154(b) by 0 days.

(21) Appl. No.: 13/688,131

(22) Filed: Nov. 28, 2012

(65) Prior Publication Data

US 2013/0091519 A1    Apr. 11, 2013

Related U.S. Application Data

(63) Continuation-in-part of application No. 11/701,822, filed on Feb. 2, 2007.

(51) Int. Cl.

| | |
|---|---|
| *H04N 7/10* | (2006.01) |
| *H04N 21/81* | (2011.01) |
| *H04N 21/234* | (2011.01) |
| *G06Q 30/02* | (2012.01) |
| *G06Q 30/06* | (2012.01) |
| *G11B 27/036* | (2006.01) |
| *G11B 27/28* | (2006.01) |
| *G11B 27/34* | (2006.01) |

(52) U.S. Cl.
CPC ............. *H04N 21/812* (2013.01); *G06Q 30/02* (2013.01); *G06Q 30/0601* (2013.01); *G11B 27/036* (2013.01); *G11B 27/28* (2013.01); *G11B 27/34* (2013.01); *H04N 21/23424* (2013.01)

(58) Field of Classification Search
USPC ...................................................... 725/32–36
See application file for complete search history.

(56) References Cited

U.S. PATENT DOCUMENTS

| | | | |
|---|---|---|---|
| 5,060,068 | A | 10/1991 | Lindstrom |
| 5,933,811 | A | 8/1999 | Angles et al. |
| 6,036,601 | A | 3/2000 | Heckel |
| 6,704,930 | B1 | 3/2004 | Eldering et al. |
| 7,062,510 | B1 | 6/2006 | Eldering |
| 7,689,062 | B2 | 3/2010 | Baharav et al. |
| 7,870,577 | B2 * | 1/2011 | Haberman et al. ............. 725/35 |
| 2002/0161635 | A1 * | 10/2002 | Berg et al. ...................... 705/14 |
| 2003/0028432 | A1 | 2/2003 | Troyansky et al. |

(Continued)

FOREIGN PATENT DOCUMENTS

GB          EP1168210  A1      1/2002

*Primary Examiner* — Olugbenga Idowu
(74) *Attorney, Agent, or Firm* — Maschoff Brennan

(57) ABSTRACT

A method of presenting advertising opportunities to users of a digital advertising placement system is described. The method includes receiving sequences of video material from a video material source, the sequences of video material having been processed from original video material to select parts of the original video material which are suitable for placement of digital advertising components. The method further includes incorporating the received sequences of video material into an online catalog accessible to a plurality of users via a data communications network, the online catalog allowing remote access to a user to identify one or more sequences which are of interest to an advertiser wishing to conduct digital advertising placement using said system.

17 Claims, 30 Drawing Sheets

(56) References Cited

U.S. PATENT DOCUMENTS

| | | |
|---|---|---|
| 2003/0135460 A1 | 7/2003 | Talegon |
| 2004/0116183 A1 | 6/2004 | Prindle |
| 2004/0194127 A1* | 9/2004 | Patton et al. ............... 725/32 |
| 2005/0137958 A1* | 6/2005 | Huber et al. ............... 705/37 |
| 2005/0203796 A1 | 9/2005 | Anand et al. |
| 2007/0050382 A1* | 3/2007 | Bugir et al. ............... 707/100 |
| 2007/0113184 A1 | 5/2007 | Haot et al. |
| 2007/0162379 A1* | 7/2007 | Skinner ............... 705/37 |
| 2008/0097872 A1 | 4/2008 | Peckover |

* cited by examiner

FIG. 17

PROCESSING AND APPARATUS FOR ADVERTISING COMPONENT PLACEMENT UTILIZING AN ONLINE CATALOG

CROSS REFERENCE TO RELATED APPLICATIONS

This application is a continuation-in-part of U.S. patent application Ser. No. 11/701,822, filed on Feb. 2, 2007, the entire content of which is incorporated herein by reference. This application also claims the benefit under 35 U.S.C. §119(a) and 37 CFR §1.55 to UK Patent Application No. GB 0623411.6, filed on Nov. 23, 2006, the entire content of which is incorporated herein by reference, and UK Patent Application No. GB 0624789.4, filed on Dec. 12, 2006, the entire content of which is incorporated herein by reference.

TECHNICAL FIELD

The invention relates to a process and apparatus for the placement of advertising components into content, and particularly video material.

BACKGROUND

It is well known to display advertisements, made of one or more graphical components before, during or after a television program or film. For example, a television program may be spliced into a plurality of segments and advertising components may be displayed in between spliced segments, before the television program and after the television program. However, the splicing of a program into segments deteriorates a consumers viewing pleasure when watching the program. Accordingly, this type of intrusive placement of advertising components is not popular with consumers. In addition, the introduction of digital television set-top boxes, such as Sky Plus from BSkyB, means that a consumer can skip or fast forward advertising components. This reduces the amount of revenue generated by the placement of advertising components.

It is also known to place advertising components strategically within a shot when recording a television program or film. For example, as illustrated in FIG. 1, Coca Cola™ glasses are positioned on a table within a shot. This type of advertising is more acceptable to the consumer. However, due to an increasingly global market where television programs and films are shown around the world, this type of advertising has limitations. For example, an advertiser may only have paid to advertise their product in one country, or brands may differ between countries. Furthermore, this type of advertising has to be considered prior to recording the television program or films etc.

Embodiments of the invention seek to provide improved methods, including business processes and apparatus for placing advertising components in video material such as television programs or films etc.

SUMMARY

In accordance with one aspect of embodiments of the invention, there is provided a method of presenting advertising opportunities to users of a digital advertising placement system, comprising:

receiving sequences of video material from a video material source, the sequences of video material having been processed from original video material to select parts of the original video material which are suitable for placement of digital advertising components; and incorporating the received sequences of video material into an online catalog accessible to a plurality of users via a data communications network, the online catalog allowing remote access to a user to identify one or more sequences which are of interest to an advertiser wishing to conduct digital advertising placement using said system. Users are able to view sequences of video material within the online catalog that have been selected as being suitable for the placement of digital advertising components.

In some embodiments, the sequences of video material received from a video material source comprise sequences of video material selected from one broadcast video content item. This enables users to select video material from one broadcast video content item for digital advertising placement.

In some embodiments, the online catalog is searchable based on characteristics of the video material, such as, but not limited to, genre, viewing figures, and characters appearing in the video material. This enables users to view video material within the online catalog comprising desired characteristics, and facilitate the selection of video material with the desired characteristics.

In some embodiments, the online catalog includes one or more metrics related to the video material, such as, but not limited to, length of selected parts of the original video material which are suitable for placement of digital advertising components. The metrics provided to the user, allow the user to make a more informed selection of video material.

In some embodiments, the online catalog includes one or more indicators for suitable placement zones, marked within the video material, allowing users to see the location in which the digital advertising component will be added.

In some embodiments, the method may comprise:

associating metadata with the received sequences of video material; and utilizing said metadata to assign permission to review the relevant part of the online catalog. This process enables of selection of relevant video material, and restriction of access to confidential material, based on permissions. The metadata may identify the video material source. In addition, or in the alternative, The metadata may identify a category of access.

Some embodiments comprise receiving an identity of a user and permitting access to selected parts of the online catalog and preventing access to other parts of the online catalog, based on said user identity.

In some embodiments, allowing remote access to the online catalog comprises providing an approval stage, wherein a user may provide approval or rejection of a selected sequence of video material during the approval stage.

In accordance with a further aspect of embodiments of the invention, there is provided apparatus for presenting advertising opportunities to users of a digital advertising placement system, comprising:

one or more data communication interfaces receiving sequences of video material from a video material source, the sequences of video material having been processed from original video material to select parts of the original video material which are suitable for placement of digital advertising components, a data storage system incorporating the received sequences of video material into an online catalog accessible to a plurality of users via a data communications network; and a server system allowing remote access to a user of the online catalog to identify one or more sequences which are of interest to an advertiser wishing to conduct digital advertising placement using said system.

In accordance with a further aspect of embodiments of the invention, there is provided a method of presenting advertising opportunities to users of a digital advertising placement system, comprising:

receiving, at a user system, one or more sequences of video material from an online catalog, the sequences of video material having been processed from original video material to select parts of the original video material which are suitable for placement of digital advertising components; and the user identifying one or more sequences which are of interest to an advertiser wishing to conduct digital advertising placement using said system.

Some embodiments comprise transmitting an identity of the user and receiving access to only selected parts of the online catalog, based on said user identity.

Some embodiments comprise receiving user input which specifies access credentials, said access credentials including said user identity.

BRIEF DESCRIPTION OF THE DRAWINGS

For a better understanding of the invention and as to how the same may be carried into effect reference will now be made, by way of example only, to the accompanying drawings, in which:

FIG. 17 illustrates the video material presented to a reviewer for a campaign;

DETAILED DESCRIPTION

Additional advantages and novel features of the invention will be set forth in part in the description which follows, and in part will become apparent to those skilled in the art upon examination of the following and accompanying drawings or may be learned by practice of the invention.

The Internet is becoming increasingly dominant in society due to its large and varied content. The Internet comprises a plurality of types of video material such as, for example films, television programs, sport events, or music events, which originate from, for example, film studios, broadcasters, and production companies, and so called user-generated video clips, which originate from non-professional providers. The number of user-generated video clips available on the internet is increasing as a result of the increased number of video cameras and recording devices, such as mobile telephones, having image and sound recording functions. These user-generated video clips have been known to reach a vast and diverse audience as a result of new modes of distribution including, but not limited to, video-based websites and user groups, such as www.youtube.com (recently acquired by google), IPTV, and as a result of being emailed as attachments to multiple users, and can reach a "viral" status relatively quickly.

Embodiments of the invention aim to utilize the vast reservoir of video material available on the internet, for advertising purposes.

Video material may be audio visual material. Herein the term video material refers to moving images, and includes without limitation audio visual moving images material as well as visual moving images alone. The term video material is intended for internet or web based consumption, as well as material for distribution on traditional broadcast media.

Figure 1:
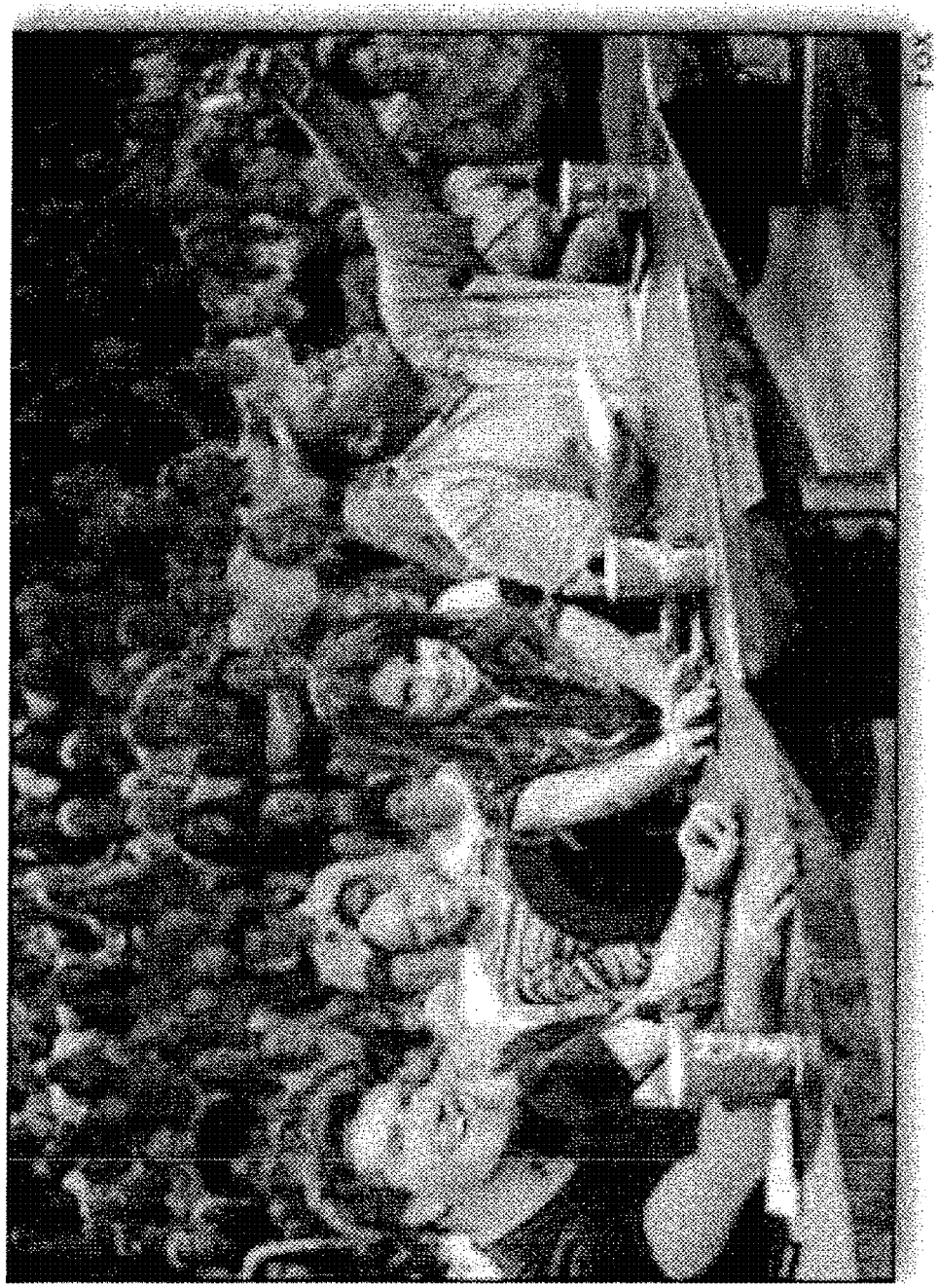
FIG. 1 illustrates the placement of Coca Cola™ glasses on a table during the recording of a television program.
Figure 2:
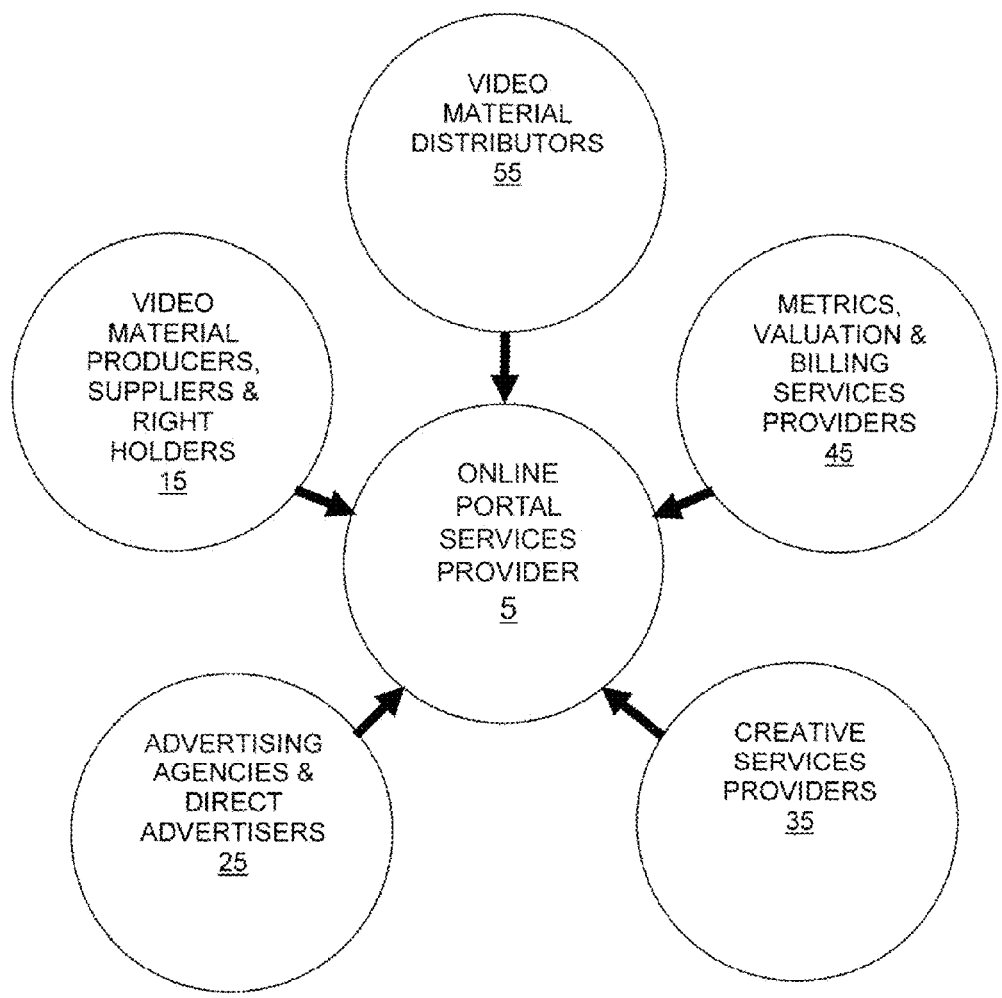
FIG. 2 illustrates a plurality of different users and providers which can be brought together by a process of the invention.

FIG. 2 illustrates a plurality of different users and providers which can be brought together by embodiments of the invention in order to utilize video material for advertising purposes.

The online portal 5 is an advertising services provider. As illustrated in FIG. 2, the online portal services provider 5 can interface with a plurality of different users and providers in order to create an advanced advertising service. The service providers/users which may interface with the online portal services provider 5 are: video sources, such as material producers, suppliers and right holders 15; advertiser, such as advertising agencies and direct advertisers 25; creative services providers 35; content analyzers, such as, metrics, valuation and billing services providers 45; and video material distributors 55.

The online portal services provider 5 is capable of interfacing with at least one and preferably a plurality of different video material producers, suppliers and right holders 15. The video material producers, suppliers and right holders 15 are producers and/or suppliers of video material, such as films, television programs, sport events, music events and/or user-generated video clips. The video material may have been created using any one of a plurality of different software programs and may be suitable for display on any one of a plurality of different electronic devices, such as personal computers, digital television set-top boxes, mobile telephones, personal digital assistances (PDAs), gaming systems and/or MP3 players. Consequently, the online portal service provider 5 is capable of utilizing video material of any one of a plurality of different formats.

Furthermore, the video material producers, suppliers and right holders 15 must have the authority to consent to the use of the video material by the online portal services provider 5 with advertising components. If video material producers, suppliers and right holders 15 do not have the authority to consent to the use of video material by the online portal services provider 5 with advertising components, then the online portal services provider 5 will not interface with that video material producer, supplier and right holder 15 regarding that video material.

The online portal service provider 5 is also capable of interfacing with at least one and preferably a plurality of different advertising agencies and direct advertisers 25. The advertising agencies and direct advertisers 25 can be any advertising agencies or direct advertisers who wish to place an advertising component in video material.

The online portal services provider 5 is also capable of interfacing with at least one and preferably a plurality of different creative services providers 35. The creative services providers 35 may provide services such as the design and creation of advertising components for the advertising agencies and direct advertisers 25.

The online portal services provider 5 is also capable of interfacing with at least one metrics, valuation and billing services provider 45. The metrics, valuation and billing services provider 45 is capable of providing metrics data indicating, for example, which video material is predicted to be the most watched, by whom, and how many users have viewed each video material to date. This and similar data can be used in order to determine the price for placing an advertising component in a particular video material, such that the video material which is viewed the most is the most expensive. Furthermore, the metrics data can be used to determine the amount payable to the online portal services provider 5 by the advertising agencies and direct advertisers 25. For example, advertising agencies and direct advertisers 25 may make a payment in respect of how many people have viewed the video material comprising their advertising component. Therefore, the metric data can be used to determine how many people have viewed the video material since the advertising component was inserted and consequently how much is payable to the online portal services provider 5.

The online portal services provider 5 is also capable of interfacing with at least one and preferably a plurality of different video material distributors 55. The video material distributors 55 distribute the video material once relevant advertising components have been placed in the video material. The video material distributors, may distribute the video material to a plurality of electronic devices of the same or different types, such that the video material may be distributed in a plurality of different formats, each format suitable for viewing on a different type of electronic device.

The online portal services provider 5 interfaces with some or all of the above mentioned components 15 to 55 in order to perform all the tasks which are involved in the successful placement of advertising components in video material and distributing the video material.

Figure 3:
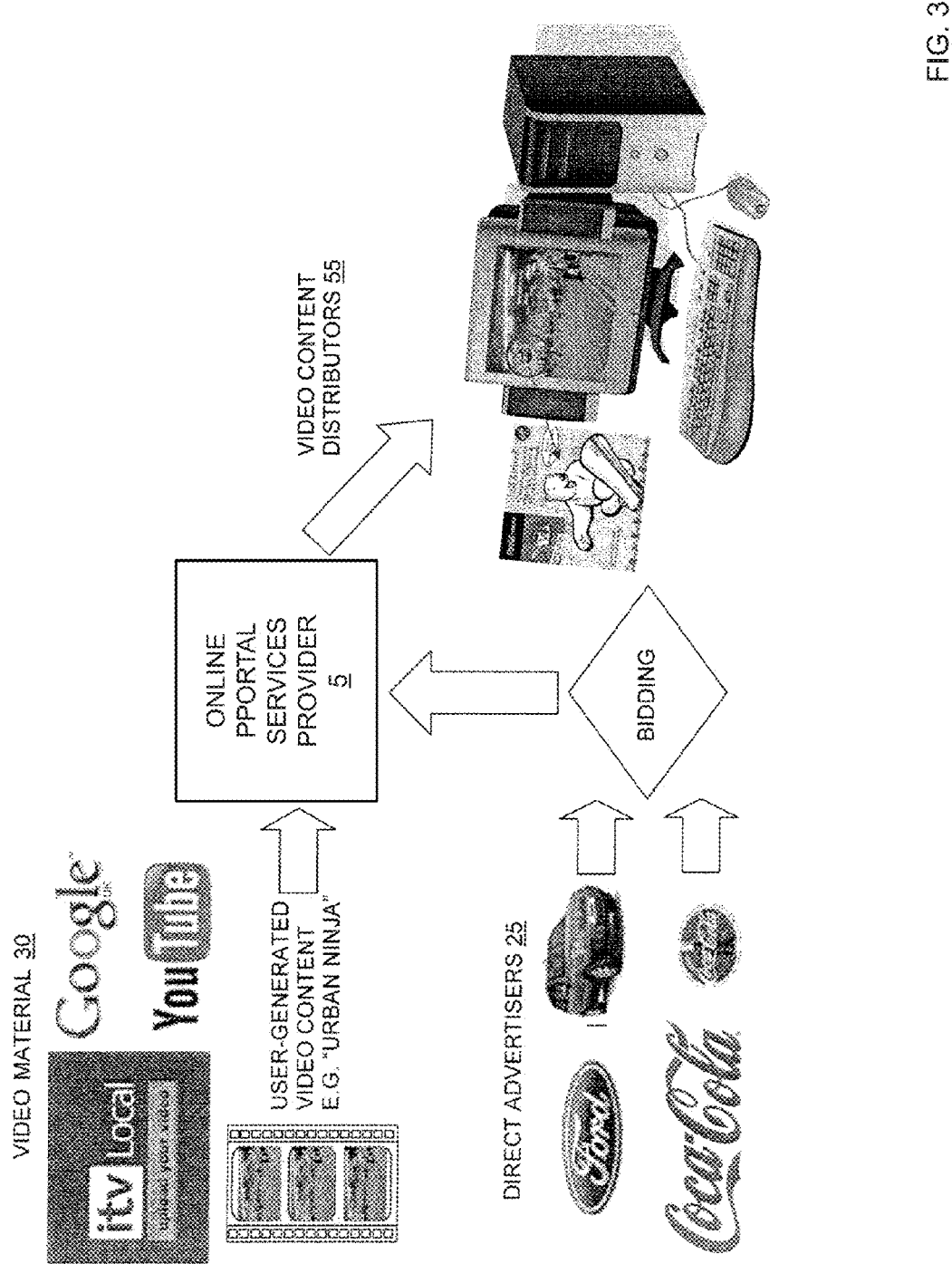
FIG. 3 illustrates one embodiment of the invention where direct advertisers place bids in order to insert an advertising component in user-generated video material.

FIG. 3 illustrates one embodiment of the invention where direct advertisers 25, with authority to use brands such as Ford™, and Coca Cola™, place "bids" in order to insert an advertising component in the user-generated video material "Urban Ninja". The user-generated video material is obtained by the online portal services provider 5 from a video material producer, supplier and right holder 15 such as ITV Local, Google™, or YouTube™.

In one embodiment of the invention, the insertion of an advertising component in video material is managed by an advertising salesman; such that the salesman is in contact with different advertisers in order to negotiate placement of an advertising component and payment for placement of the advertising component.

In another embodiment of the invention the online portal services provider 5 organizes the bidding process, for example by generating a market of placement zones, facilitating comparisons, managing bidding and acceptance processes, setting a deadline when the final bids are to be submitted, and awarding the advertising rights to the direct advertiser 25 who submitted the most desirable bid.

In FIG. 3, the direct advertiser Coca Cola™ is successful and consequently, the Coca Cola™ advertising component is inserted into the relevant zone in the "Urban Ninja" user-generated video material by the online portal services provider 5. The online portal services provider 5 then releases the "Urban Ninja" user-generated video material comprising a Coca Cola™ advertising component to a video material distributor 55, such as ITV Local, Google™ or YouTube™. The "Urban Ninja" user-generated video material comprising a Coca Cola™ advertising component can then be viewed by a plurality of users via an electronic device, such as a personal computer as illustrated in FIG. 3.

Figure 4:
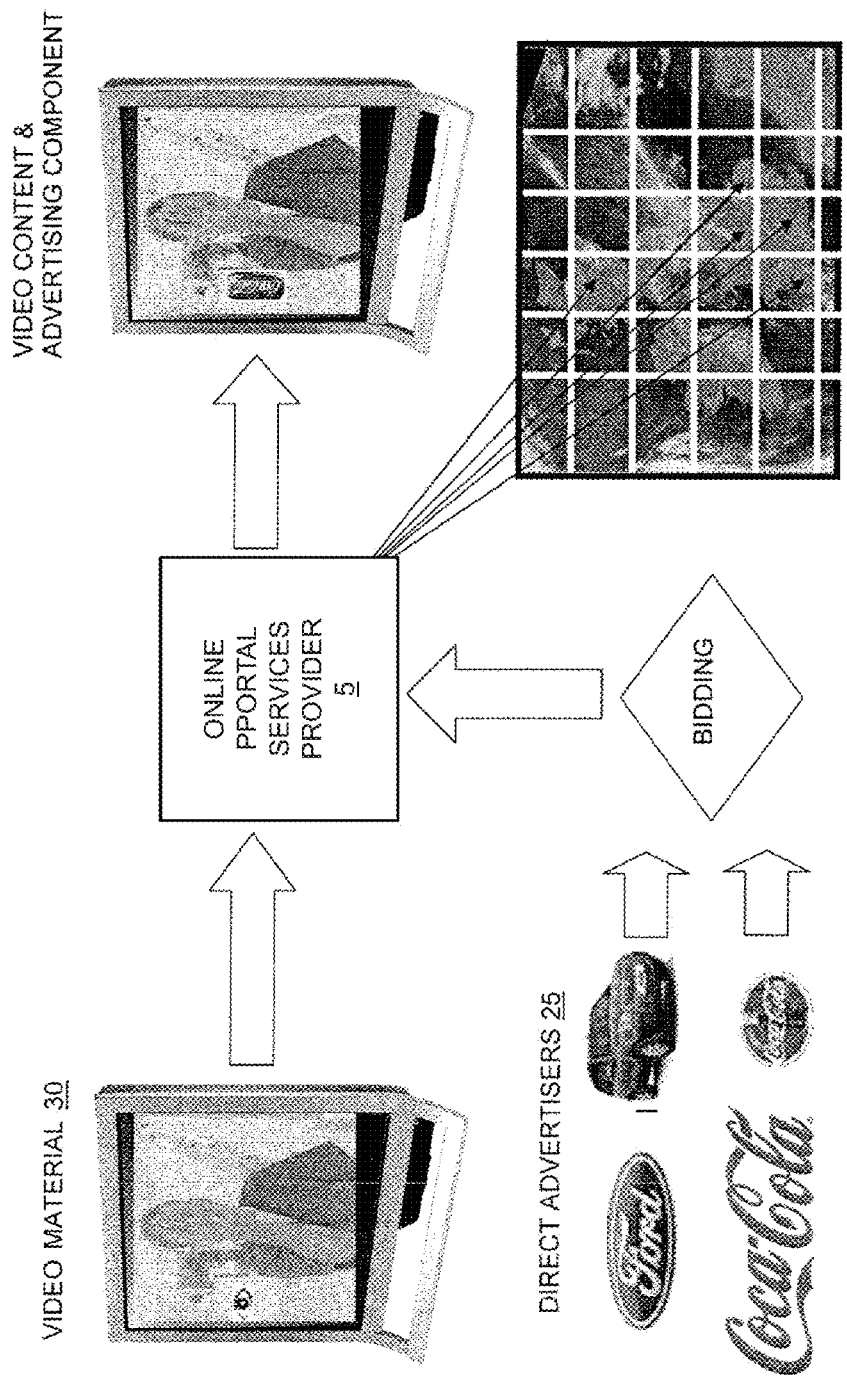
FIG. 4 illustrates another embodiment of the invention where direct advertisers place bids in order to insert an advertising component in video material.

FIG. 4 illustrates another embodiment of the invention where direct advertisers 25, such as Ford™ and Coca Cola™ place bids in order to insert an advertising component in video material, such as the television program Big Brother™. The video material is obtained by the online portal services provider 5 from a video material producer, supplier and rights holder 15.

In one embodiment of the invention, the insertion of an advertising component in video material is managed by an advertising salesman, such that the salesman is in contact with different advertisers in order to negotiate placement of an advertising component and payment for placement of the advertising component.

In another embodiment, the online portal services provider 5 oversees the bidding process, for example by setting a deadline when the final bids are to be submitted, and awards the advertising rights to the direct advertiser 25 who submitted the most desirable bid.

In FIG. 4, the direct advertiser Coca Cola™ is successful and consequently, the Coca Cola™ advertising component is inserted into the video material by the online portal services provider 5.

The Coca Cola™ advertising component is inserted into the video material by the online portal services provider 5 in respect of specific regions only. In the embodiment illustrated in FIG. 4 a region is an area of the United Kingdom, such as a broadcast region. However, a region may also be a specific country or a group of countries, such as Europe. The online portal services provider 5 then releases the video material comprising the Coca Cola™ advertising component to a video material distributor 55, who distributes the video material comprising the Coca Cola™ advertising component to only the specific regions. Finally, the video material comprising the Coca Cola™ advertising component can be viewed by a plurality of users, within the selected regions, via electronic devices, such as a television as illustrated in FIG. 4. Some embodiments support the placing of advertising components with active hyperlinks, through which individual users can indicate interest and through which online portal can measure and record interest and/or responses from individual advertising targets.

The non-selected regions in which the Coca Cola™, advertising component is not inserted may be shown without the Coca Cola™, advertising component, or a different advertising component may be inserted.

Figure 5:
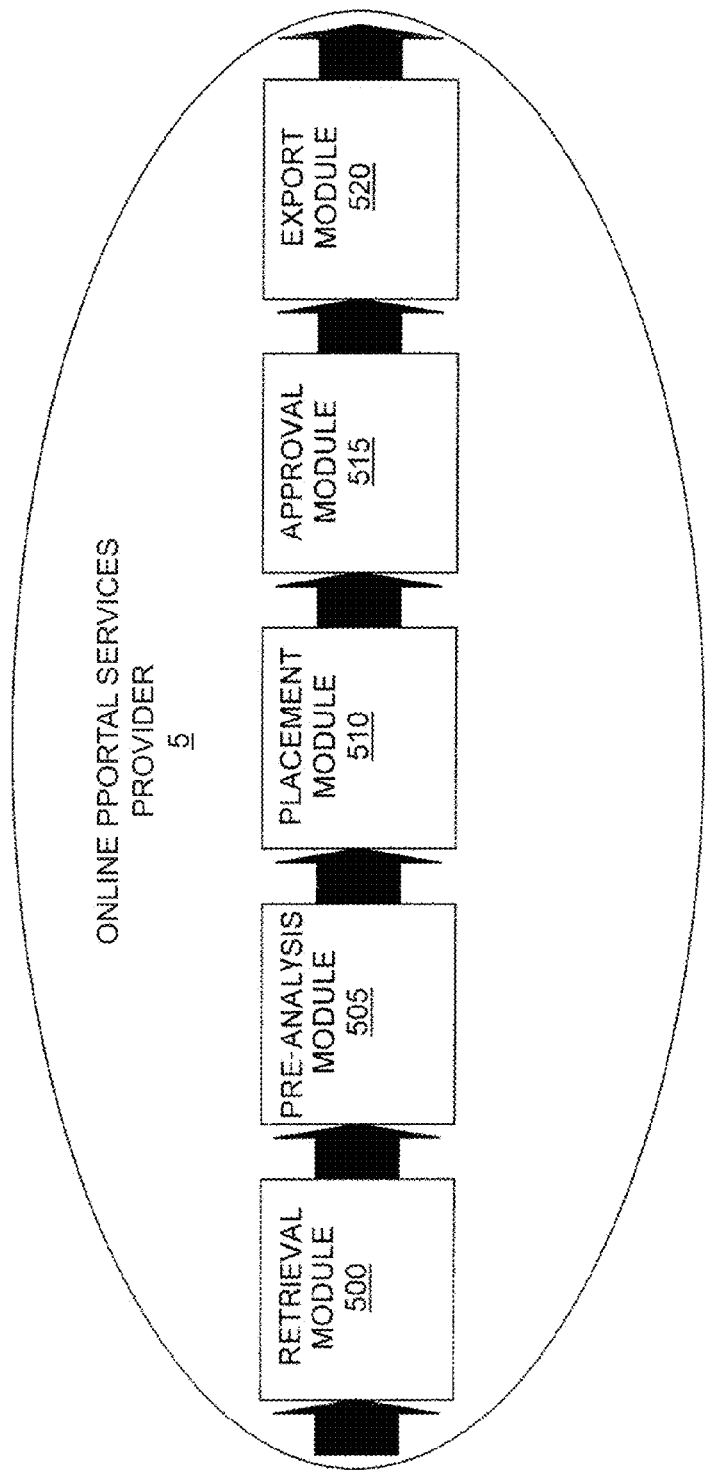
FIG. 5 illustrates an overview of a process of the invention carried out by an online portal services provider.

FIG. 5 illustrates an overview of the processes carried out by an online portal services provider 5 of the invention. As illustrated in the embodiment of FIG. 5 the online portal services provider 5 comprises a video retrieval module 500; a pre-analysis module 505; a placement module 510; an approval module 515; and an export module 520.

The video retrieval module 500 is capable of interfacing with at least one and preferably a plurality of video material producers, suppliers and rights holders 15. The online portal services provider 5 retrieves video material from the plurality of video material producers, suppliers and right holder 15 which is suitable for the insertion of at least one advertising component. Prior to being retrieved, it is established that the video material producer, supplier and right holder 15 of the video material is authorized to, and does authorize the use of the video material with advertising components. In 20 some embodiments, the video material is screened at this stage to ensure the content is appropriate for distribution. Furthermore, it is established that the video material is in one of the plurality of formats which the online portal services provider 5 is capable of using. In preferred embodiments, the retrieved content, which may be in one of many supported formats (e.g. QuickTime™, AVI™, Windows Media™, MPEG), is converted into an operating format suitable for use during the placement of the advertising components into the video material (e.g. QuickTime™).

In one embodiment of the invention, the video material is inserted into a video material inventory at the retrieval stage. In a further embodiment of the invention, the 30 video material is inserted into a video material catalog, which can be accessed and searched by the advertising agencies and direct advertisers 25.

The video retrieval module 500 is also capable of interfacing with the metrics, valuation and billing services provider 45. Therefore, it is possible to obtain metrics data about each retrieved video material, such as the number of users viewing the video material. The video material can then be inserted into a video material league table, based on the video material metrics data. For example, the most popular video material may be placed at the top of the video material league table. In certain embodiments, there may be a plurality of league tables dealing with popularity of video material in certain categories.

The pre-analysis module 505 prepares the retrieved video material for the insertion of advertising components. The pre-analysis module 505 scans each retrieved video material in order to detect if there are any areas within the video material which can be easily tracked from frame to frame and is consequently suitable for the placement of an advertising component. If a suitable area is detected, then a place-holder is inserted into the suitable area to mark that area as a placement zone (ZoneSense™). The video material is then stored in a storage device, prior to insertion of an advertising component. Preferably pre-analysis occurs on candidate video material items in a preferred operating format. However, where content is available in a format other than an operating format, conversion to an operating format may occur before pre-analysis and the video material converted back to its original format after pre-analysis.

The placement module 510 is capable of interfacing with at least one and preferably a plurality of advertising agencies and direct advertisers 25.

An advertising agency or direct advertiser 25 has access to an online portal services provider 5 interface for searching the video material inventory, the video material catalog and/or the video material league table in order to locate video material in which they wish to insert an advertising component. Following the identification of a video material item with a desirable placement opportunity, the advertising agency or direct advertiser 25 instructs the online portal services provider 5, preferably the placement module 510 of the online portal services provider 5, to insert an advertising component, supplied by the advertising agency or direct advertiser 25, or a creative services providers 35, into the video material, onto the place-holder, such that the advertising component is integrated with the video material in the (or each) operating format. The step of instructing may comprise a purchase act or a successful bid, and/or other such acts.

Figures 6A, 6B:
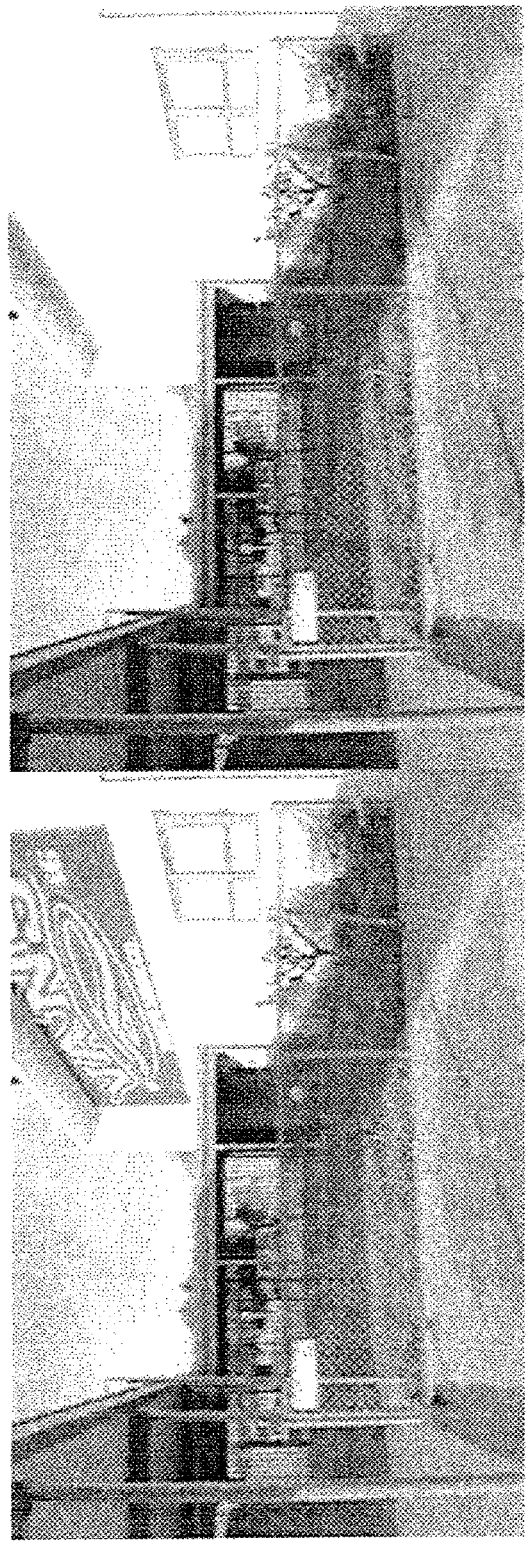
FIG. 6A illustrates video material integrated with the adverting component.
FIG. 6B illustrates video material prior to being integrated with the adverting component.

FIG. 6A illustrates an advertising component ("Vans™") integrated with a video material item and FIG. 6B illustrates the video material prior to being integrated with the adverting component.

The approval module 515 is also capable of interfacing with the advertising agencies and direct advertisers 25. Following insertion of an advertising component into video material the integrated video material and advertising component can be viewed by the advertising agency or direct advertiser 25. The advertising agency or direct advertiser 25 can then either approve or reject the integrated video material and advertising component. In one embodiment, approval of the integrated video material and advertising component is also approval of the quality, appropriateness to campaign, messages and values of the integrated video material and advertising component. In another embodiment, approval of the integrated video material and advertising component is also acceptance of the tariff.

The export module 520 is capable of interfacing with at least one and preferably a plurality of video material distributors 55. The export module 520 exports the integrated video material and advertising component to at least one video material distributor 55. In one embodiment, the video material includes a film, which is to be released as a DVD, following insertion of the advertising component, the integrated video material and advertising component are exported from the export module 520 in a file format appropriate for the manufacturing process of DVDs. The video material may include a television program, which is to be viewed through IPTV, following insertion of the advertising component, the integrated video material and advertising component are streamed and spliced, and exported as injected/spliced feed pre or post vision and editorial control. The video material may include user-generated video material, following insertion of the advertising component, the integrated video material and advertising component are exported from the export module 520 in the correct format to a hosting facility through which the video material is viewed.

The integrated video material and advertising component can also be tagged prior to export for metrics purposes.

The online portal services provider 5 can be used in order to place advertising components in "near-live" broadcast such as live television programs, which are often aired with a delay, such as 10 seconds, such that the content can be monitored. In such instances placement, quality, visibility, and duration are pre-agreed with the advertiser prior to the program being aired as it is not possible to include an approval module 515 in the process. The online portal services provider 5 is used in a studio/gallery environment. Furthermore, the services provider 5 can support multiple streams and delivery/export to multiple networks, electronic devices and regions.

Figure 7:
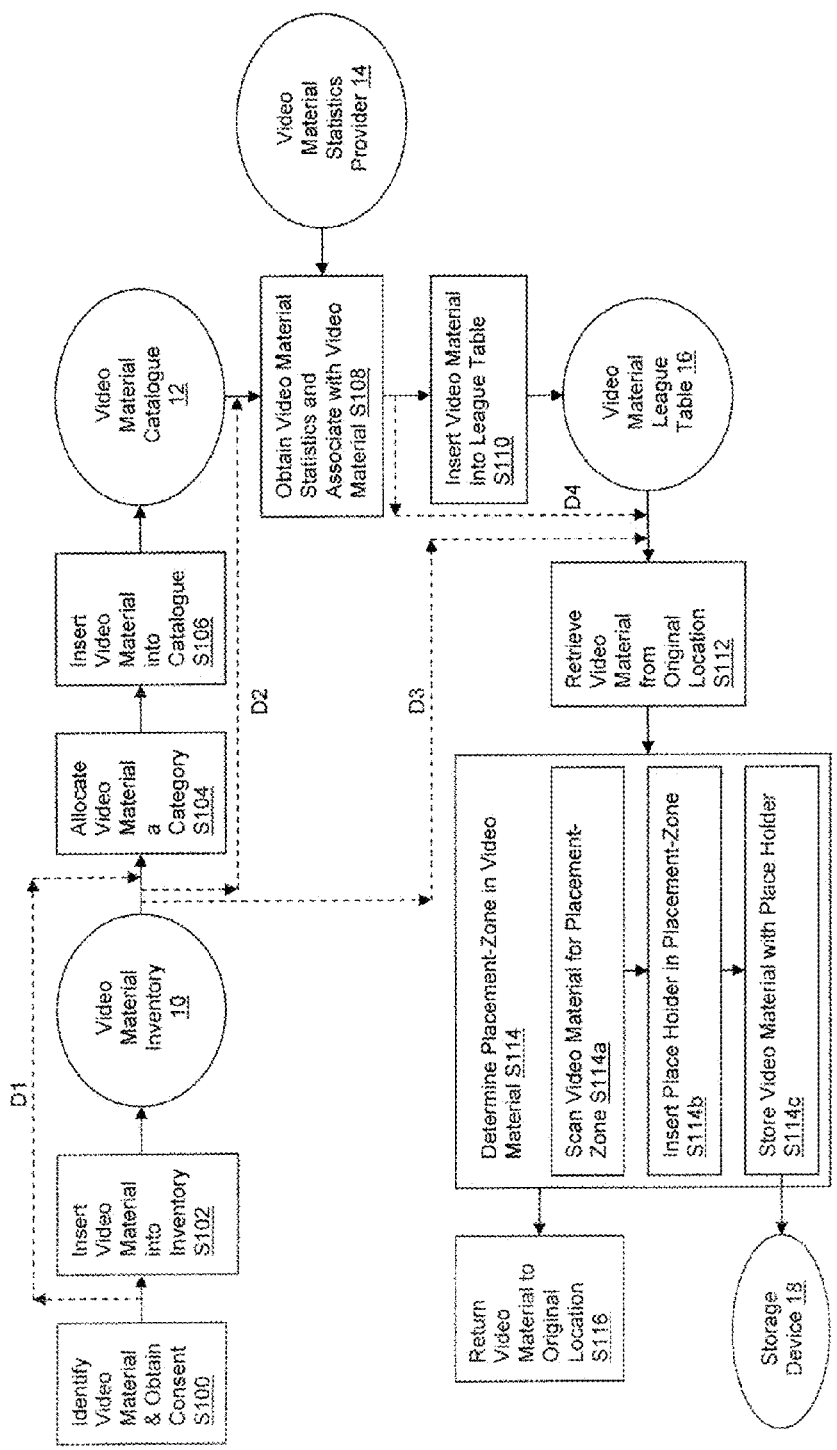
FIG. 7 illustrates a process of identifying and pre-processing a video material for the insertion of an advertising component.

FIG. 7 illustrates a process for identifying and pre-processing video material which is suitable for the placement of an advertising component. Video material may be, for example a user-generated video clip, a film, a television program, a sports event, a music event of any duration, or a static image, such as a photograph.

In step S100 video material which is considered suitable for the placement of an advertising component is identified. The step of identifying video material may be performed by any person who has the authority to determine whether the video material is suitable. For example, video material may not be considered suitable if it contains pornographic content or extremely violent content. Alternatively, the video material may not be considered suitable if its quality of reproduction is such that it does not meet certain predetermined standards. Such steps may also be performed automatically based on labels, meta-tags or the like indicating the nature and/or content of the video material.

The video material can be any video material which is currently displayed on the internet such as for example a user-generated video clip, a film, a television program or an event, of any duration. In an alternative embodiment, the producer of video material may submit the video material for consideration by the online portal services provider 5, rather than waiting for the video material to be identified by the process of the invention. In another embodiment, video material may be identified prior to placement of the video material on the internet.

Once suitable video material has been identified, the producer(s)/right holder(s) of the video material must be located so that his/her authorization can be obtained for placement of an advertising component in the video material. If the producer(s) authorization is not obtained then the video material is no longer considered suitable.

Following identification of video material at step S100, the process moves to step S102 where the video material is inserted into a video material inventory 10. The video material inventory 10 comprises a list of all identified suitable video material.

At step S104 the video material is allocated at least one category. The video material may be allocated a category based on, for example, the genre of the video material, the type of video material, or the substance of the video material. For example, if video material is considered to be humorous, then it may be allocated to the category "humorous"; if video material is a user-generated video clip, then it may be allocated to the category "user-generated video clip"; or if video material involves skate boarding, then it may be allocated to the category "skate boarding". One video material may be allocated several different categories, for example a user-generated video clip featuring skate boarding may be allocated to the category "user-generated video clip" and to the category "skate boarding". Furthermore, video material may be allocated to a category and then also allocated to a sub-category of that category. For example, video material involving a humorous dog may be allocated to the category "humorous animal", and then may also be allocated to the sub-category "dogs". The above mentioned categories are described for illustrative purposes only, and the invention is not limited to the categories detailed above.

In another embodiment of the invention the video material is divided into sections and each section is assigned a different category. For example, video material may be assigned a category or sub-category summarizing the overall content, such as "humorous" or "user-generated video clip". The video material is also divided into sections and each section is assigned a different category, for example a section may be categorized based on the actor/actress featured in the section, or a section may be categorized based on the type of location, e.g. a city/countryside/beach scene.

For example, a film may be two hours long and may comprise multiple sections of video material which are suitable for the insertion of an advertising component to create integrated video material and advertising components. Therefore, one section of the film may comprise a scene involving a large building onto which an advertising component could be inserted and another section of the film may comprise a close-up of an actor wearing a T-shirt, onto which an advertising component could be inserted. In one embodiment, the advertising components may originate from the different advertisers.

In another embodiment, the video material may comprise metadata, which is computed based on the video material content. The metadata can be used to support searching of a plurality of video material using queries such as "looks like . . . ."

In another embodiment of the invention, video material databases are automatically processed to produce a representation of the database that is quickly searchable. Therefore the video material is pre-processed as it is retrieved. A video material database can then be searched to find video material or a section of video material that "looks like" an image or video sample. For example, given an image or video sample with clouds or a building, an operator could search for similar video material.

At step S106, the video material is inserted into a video material catalog 12. The video material catalog 12 comprises a list of all the identified suitable video material which is available for the placement of advertising components. The video material catalog 12 is divided into categories such as genre of video material, type of video material, substance of video material. Furthermore, all the identified video material which has been allocated to the same category is grouped together under that category in the video material catalog 12. Therefore, it is easier for a user to peruse the video material catalog 12 in order to locate a specific category of video material.

The video material catalog 12 may also comprise information about the video material such as the running time of the video material the date of creation of the video material, and/or whether an advertising component has already been placed in the video material etc.

In one embodiment, the video material catalog 12 is implemented as a relational database and is accessible via the Internet. The relational database can be searched using any appropriate search functions. For example, a user of the video material catalog 12 is required to enter a search term, such as "user-generated video clip" and all the video material which has been allocated to the category "user-generated video clip" is displayed. Any aspect of the database may be searched, for example genre or subject. In a further embodiment, the search results are displayed in batches, for example only ten "user-generated video clips" may be displayed at the same time on the same web page. In one embodiment of the invention it is not necessary to insert the identified video material into the video material inventory 10 at step S102 prior to allocating the identified video material a category. Therefore, it is possible to move directly from step S100 to step S104 as illustrated by the dotted line D1.

At step S108 video material statistics are obtained from a video material statistics provider 14 and are associated with the video material. The video material statistics comprise data about the video material such as how many people have viewed the video material in a certain period of time, or since the video material was placed on the internet. This data can be updated, for example, every 24 hours, every week or in real time. The video material statistics provider 14 is an independent provider of statistics and may be the metrics, valuation & billing services providers 45 described above.

The provided video material statistics may be associated with each identified video material such that when viewing a plurality of identified video material the statistics associated with each video material are also displayed. Therefore, a user is able to quickly determine how regularly a video material is viewed. Alternatively, or in addition, the system may include its own image statistics provider.

In one embodiment of the invention it is possible to insert video material in the video material inventory 10 at step S102, then go directly to step S108 of obtaining and associating the video material statistic data for the identified video material as illustrated by dotted line D2. In this embodiment a video material catalog 12 is not created.

With the video material statistics data the video material may be inserted into a video material league table 16 at step S110. The video material league table 16 displays at least two identified video materials ordered as a result of the associated video material statistics, such that the most viewed video material is at the top of the video material league table 16.

At step S112 the identified video material is retrieved from its current location for processing. Then at step S114 the retrieved video material is analyzed in order to determine if there is at least one placement zone (ZoneSense™) in the video material. A placement zone is an area within the identified video material which is suitable for the placement of an advertising component. For example, a placement zone is preferably in view for at least a minimum predetermined period of time, is of at least a minimum predetermined area and is not too obscured by objects in front of it. The step of analyzing the video material in order to determine if there is a placement zone can be performed by an operator, or alternatively, it may be automated.

In one embodiment of the invention, if following examination it is determined that there is no placement zone in the identified video material, then the video material is no longer considered suitable. Consequently, the video material is removed from the video material inventory 10, the video material catalog 12 and/or the video material league table 16 as appropriate.

The placement zone may be of any size as long as it is larger than the minimum predetermined area. In addition, the placement zone may be in the foreground or the background of the video material. However, it will be apparent that larger, more prominent advertising components are of more value to a brand owner. In addition, if the placement zone is in the background, then the placement zone may include a travelling matte defining the visible area of the placement zone. This travelling matte might be defined by masks created by an operator (e.g. by rotoscoping or painting a mask) or by automatic processing of the video material.

In order to determine if there is at least one placement zone in the video material, the video material is scanned at step S114a in order to detect any area within the video material which can be tracked easily as it is in view for at least a minimum predetermined period of time and is of at least a minimum predetermined area. Following identification of at least one placement zone, the video material is pre-processed for the insertion of an advertising component by the placement of a place holder in the placement zone at step S114b. The place holder marks an area within the video material which is the placement zone and is thus suitable for the placement of an advertising component. The video material is then stored in a storage device 18 with the place holder, such that it will be relatively easy to place an advertising component in the video material placement zone at a later date. In another embodiment only the part of the video material with the placement zone holder is stored in a storage device 18.

In another embodiment of the invention, the detection of at least one placement zone in the video material is performed automatically. For example, in order to determine if there is a placement zone in the video material, the video material is scanned to determine if there are any areas within the video material which can be tracked from frame to frame, such that it is in view for at least a minimum predetermined period of time, is of at least a minimum predetermined area and is not too obscured by objects in front of it. This area is determined to be a placement zone. The tracking can be performed automatically using known video tracking software.

Typically a placement zone is first identified in a single frame of the video material, and then is tracked frame-by-frame through the video material in order to identify and locate the placement zone as accurately as possible in each frame taking into account that the placement zone in each frame may have changed its position, orientation, and other geometric parameters. The appearance of the placement zone may also change in each frame. For example, the placement zone may be partially obscured by other objects, or there may be shadows, highlights or other illumination changes. In as many cases as possible the tracking system should recognize and locate the placement zone. For example the software product Monet™, available from Imagineer Systems Ltd or similar commercially available technology, could be used to track placement zones through the video material.

When at least one placement zone is detected automatically, as described above, a large number of candidate placement zones are created which can then be pruned either automatically or by an operator to produce a manageable number of placement zones.

After all of the placement zones in a video material have been identified, each is assessed for its estimated difficulty for carrying out the creative aspects of adding the advertising component. The three creative aspects individually assessed are rotoscoping, tracking and lighting. The assessment categories used are: the shot presents no problems; the shot will be a time consuming process; the shot will be so time difficult to process that it should not be used.

In one embodiment of the invention, the storage device 18 is the storage device from which the identified video material was retrieved at step S112.

Finally, at step S116 the identified video material is returned to its original location with the place holder(s) to await selection and the subsequent insertion of an advertising component.

In one embodiment of the invention, the video material is not retrieved from its original location at step S114. Instead a mirror copy of the video material is made. The mirror copy video material is then pre-processed in accordance with steps S114a to S114c described above. Following pre-processing, the mirror copy video material comprising at least one place holder is returned to the video material original location and saved over the original video material. Consequently, the video material producers, suppliers and right holders 15, upon agreeing to allow the video material to have at least one advertising component inserted, also agrees to save the pre-processed and processed video material, replacing the original video material.

In a further embodiment of the invention a tariff may also be inserted into the placement zone along with the place holder, such that a user who is viewing a plurality of video material comprising placement zones is informed of the cost of inserting an advertising component into the placement zone. The placement zone may be marked by the insertion of a box around the placement zone such that the user can clearly determine the area into which an advertising component would be inserted.

In one embodiment of the invention it is possible to insert video material in the video material inventory 10 at step S102 and then go directly to step S112 of retrieving the identified video material from its original location in order to pre-process the video material, as illustrated by the dotted line D3.

In a further embodiment of the invention it is possible to move directly from step S108 of obtaining and associating video material statistic data for the video material to step S112 of retrieving the video material from its original location in order to pre-process the video material, as illustrated by the dotted line D4.

In yet another embodiment of the invention it is possible to insert video material in the video material inventory at step S102, then go directly to step S108 of obtaining and associating video material statistic data for the video material as illustrated by dotted line D2, and then moving directly to step S112 of retrieving the identified video material from its original location in order to pre-process the video material, as illustrated by the dotted line D4.

An identified video material is returned to its original location after pre-processing, but is detailed in the video material inventory 10 and/or the video material catalog 12 for selection for the insertion of an advertising component at a later time or date.

Although the above description and FIG. 7 illustrate the video material being pre-processed after insertion into a video material inventory, a video material catalog and/or a video material league table, in another embodiment of the invention the video material is pre-processed after the video material has been identified at step S100, and before being inserted into a video material inventory, a video material catalog and/or a video material league table.

Figure 8:
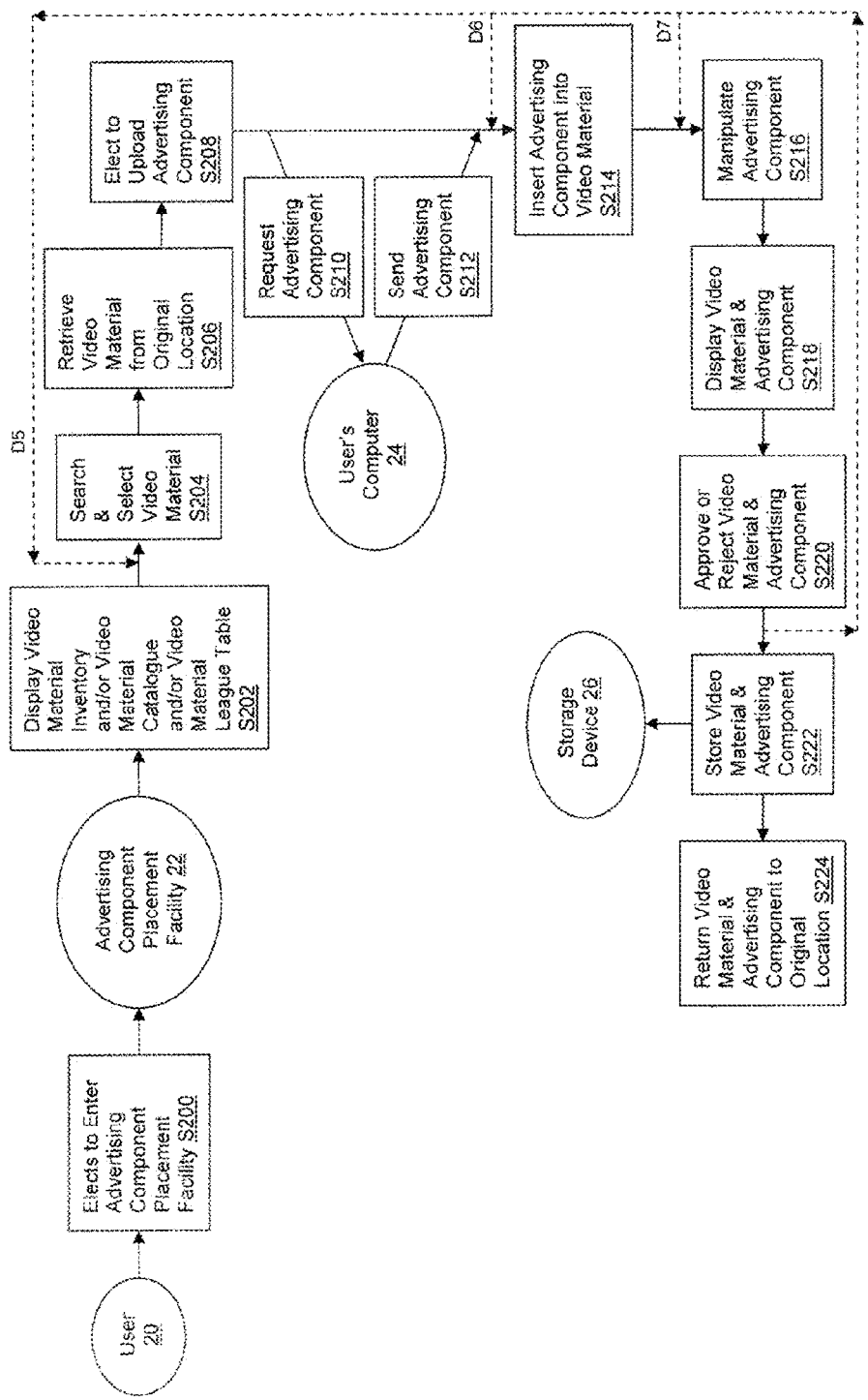
FIG. 8 illustrates a process for inserting an advertising component in a pre-processed video material.

FIG. 8 illustrates a process for placing an advertising component in an identified video material. The video material is identified and pre-processed in accordance with a process described above with reference to FIG. 7.

A user 20 elects to enter the advertising component placement facility 22 at step S200. The advertising component placement facility 22 displays the video material inventory 10 and/or the video material catalog 12 and/or the video material league table 16, described above with reference to FIG. 7, at step S202. The user 20 can then search the video material inventory 10 and/or the video material catalog 12 and/or the video material league table 16 in order to select at least one pre-processed video material for the placement of an advertising component at step S204.

In one embodiment of the invention, the user 20 may be required to login to the advertising component placement facility 22 by entering a password. In this embodiment non-authorized users are prevented from using the advertising component placement facility 22.

Upon selection of one of the pre-processed identified video material at step S204, the advertising component placement facility 22 retrieves the selected video material from its original location at step S206, so that the video material can be processed.

An advertising component which is to be inserted into the selected video material is provided by the user 20. Therefore, the user may elect to upload the advertising component from the user's computer 24 at step S208. The user 20 requests the advertising component from the user's computer 24 at step S210 and the user's computer 24 sends the advertising component at step S212. The advertising component is then inserted into the selected video material at step S214, by placement of the advertising component onto the place holder so that the advertising component is arranged in the placement zone of the video material.

In another embodiment of the invention, the user may elect to upload the advertising component from a creative services provider 35.

In one embodiment of the invention, the video material is not retrieved from its original location at step S206. Instead a mirror copy of the video material comprising at least one place holder is made. The mirror copy video material is then processed in accordance with steps S208 to S222 described above. Following processing, the mirror copy video material comprising at least one advertising component is returned to the video material's original location and saved over the original video material.

Figure 14:
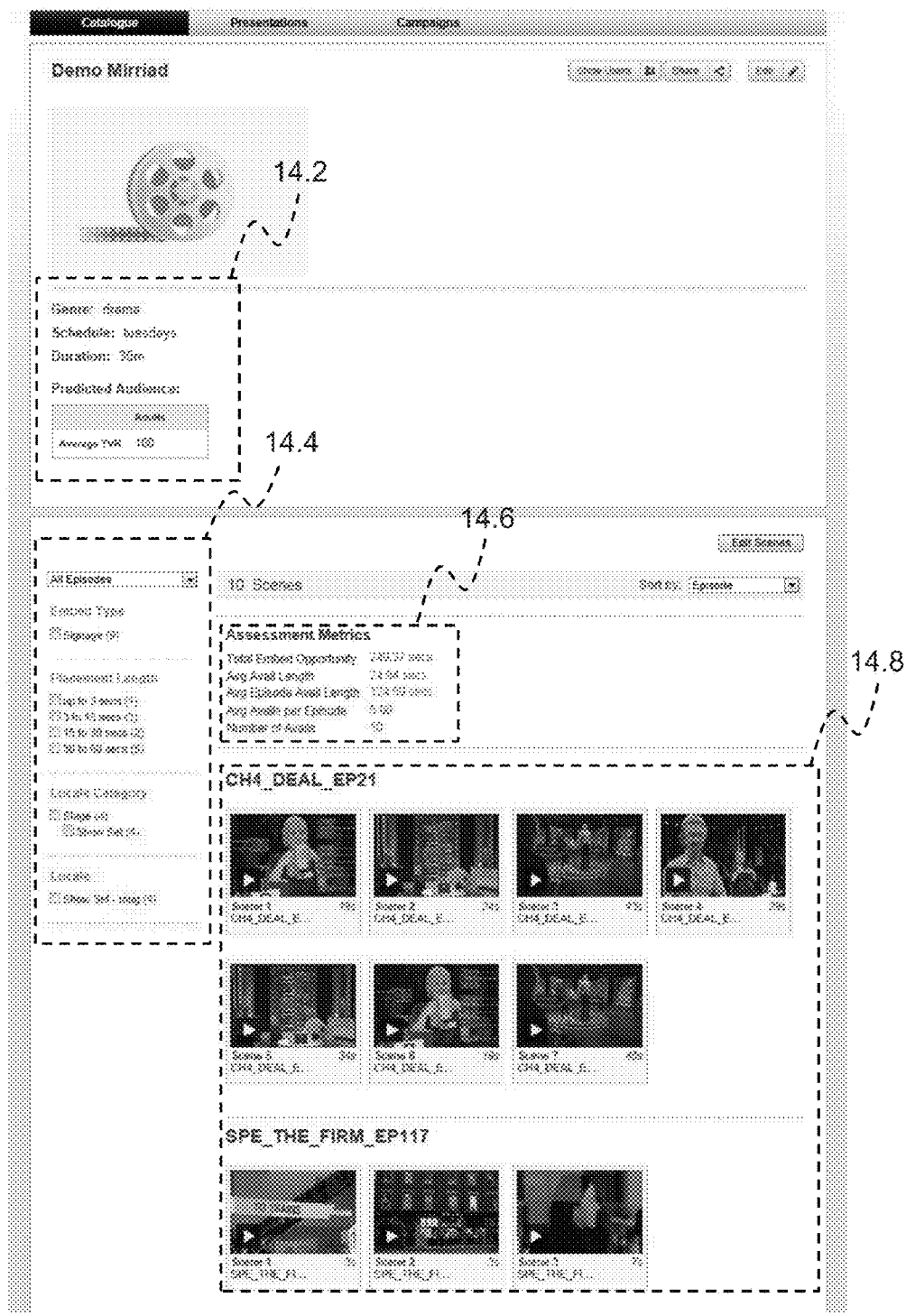
FIG. 14 illustrates an example of a video material catalog.

FIG. 14 is an example of the video material catalog 12. The user is presented with metrics of selected video material 14.2, such as the genre, scheduled transmission day, duration and predicted audience. The video material catalog 12 may be filtered based on characteristics of the video material. The filter options 14.4 show an example of filters that may be applied to the video material catalog 12. In this example, the filter options 14.4 include: the type of embed opportunity, the length of the placement zone, the locale category, and the specific locale. In further examples, the video material may be searched based on characters appearing in the video material. The assessment metrics 14.6 shows the metrics of the filtered video material, including the number of placement zones, total time of the placement zones within the video material, average placement zone length, average episode placement zone length and the average number of placement zones per episode. The video material comprising of placement zones 14.8 is sorted by episodes.

Figure 15:
FIG. 15 illustrates an example of a video presented to a reviewer for approval.

FIG. 15 is an example of a presentation of video material to the user. The title block 15.2 displays the title of the program in which the video material is intended to be broadcast, along with the episode and scene numbers, and an image of the video material with placement zone highlighted. For each video material item within the video material catalog 12, the user is able to stream or download the whole scene 15.6, and a cut down version of the scene containing the placement zones only. Metrics of the segment 15.4 are presented, including: length of the scene; length of the placement zone; embed type; locale category; and locale title.

In one embodiment of the invention the advertising component is a non-intrusive advertising component, for example the advertising component is placed on a wall, on a bus, or on a t-shirt etc. within the video material. Non-intrusive advertising components may be either static or dynamic advertising components.

A static advertising component is an advertising component which is inserted into video material, to create video material with an integrated advertising component, such that wherever the video material is viewed, by whomever and whenever the advertising component will be displayed.

A dynamic advertising component is an advertising component which is inserted into video material, to create video material and integrated advertising component, "on the fly". For example, the advertising component which is integrated may be different depending on the region in which the video material is to be displayed, and/or depending on who the viewer of the advertising component is.

Figure 9A:
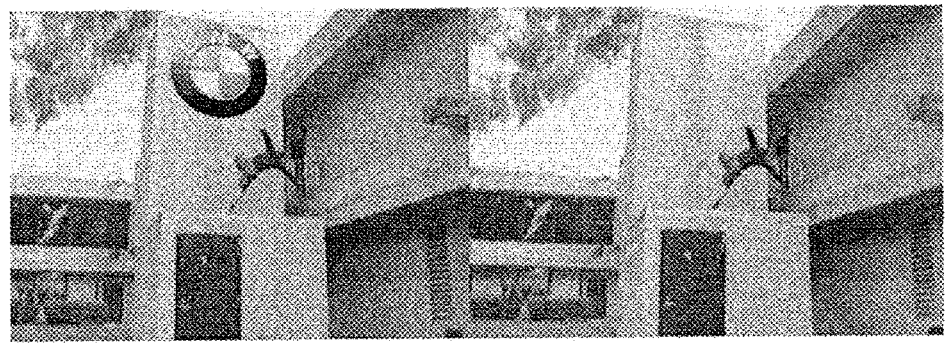
FIG. 9A illustrates a non-intrusive advertising component.

FIG. 9A illustrates a non-intrusive advertising component. The advertising component "BMW™" has been inserted into a wall within the video material.

The advertising component illustrated in FIG. 9A, is not animated, i.e. the advertising component is fixed and does not move within the video material. However, an advertising component may have features which move within the video material.

In addition, a static or a dynamic advertising component may provide a link to the advertiser's website or web page. When viewing the video material, a consumer can click on the advertising component. Clicking on the advertising component can either directly take the consumer to the advertisers website or web page, or can record that the consumer is interested in the product and wishes to mark the website or web page to return to following viewing of the video material. The link may also provide the consumer with a list of other similar video material which the consumer may enjoy, or similar/complementary products which the consumer may wish to purchase.

Figure 9B:
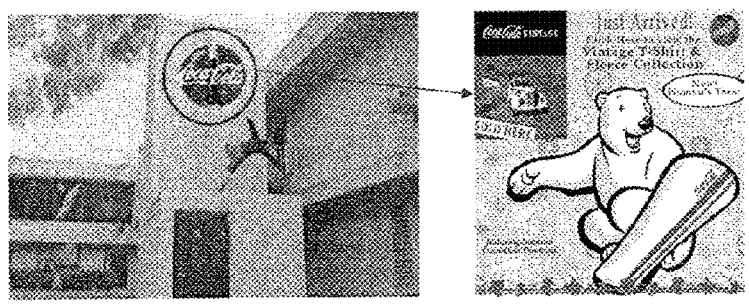
FIG. 9B illustrates a clickable link through advertising component.

FIG. 9B illustrates another non-intrusive advertising component. The advertising component "Coca Cola™" has been inserted into a wall within the video material and is a clickable hyper-link to the Coca Cola™ website.

Although the description above refers to the insertion of non-intrusive advertising components into a video material, it is also possible to apply a banner/tower advertising component to a video material using the process of the invention. A banner/tower advertising component is an advertising component which is placed at the edge of the video material, either to the side or above/below the video material, rather than inserted into the video material. A banner/tower advertising component does not require a suitable placement zone to be detected within the video material.

Figure 9C:
FIG. 9C illustrates a tower advertising component placed at the side of video material.

FIG. 9C illustrates a tower advertising component placed at the side of the video material.

Alternatively, a spliced advertising component could be used in conjunction with the process of the invention. A spliced advertising component is used where video material is spliced into sections, such as scenes, and an advertising component is placed between the sections, such as conventional television advertising.

Figure 9D:
FIG. 9D illustrates a spliced advertising component placed between two sections of video material.

FIG. 9D illustrates a spliced advertising component placed between two sections of video material.

Both banner/tower advertising components and spliced advertising components can be non-intrusive, animated or clickable hyper-link advertising components as discussed above and can be used as static or dynamic advertising components.

Returning to FIG. 8, following insertion of the advertising component into the selected video material at step S214, the advertising component is then manipulated at step S216. In one embodiment, the advertising component is manipulated such that it is the same size as the placement zone. Therefore, the advertising component may need to be resized or rotated. The advertising component may also be manipulated in other ways. For example, if the video material is of a bus driving down a street and the placement zone is part of the front of the bus, although the front of the bus is in view for a minimum predetermined period of time and is of at least a minimum predetermined size, the front of the bus is not completely flat and its position alters throughout the video material. Therefore, the advertising component when placed in the placement zone needs to be manipulated such that it appears as if the advertising component was on the front of the bus when the video material was recorded. The advertising component is manipulated such that any reflections and/or shadows that appear on the front of the bus appear on the advertising component. In addition, the advertising component may be manipulated at step S216 such that the advertising component is blurred slightly as a result of the movement of the bus.

The aim is to create a natural look such that the advertising component blends well with the video material in which it is placed. This typically involves adding appropriate shadow, highlight and other lighting effects to the placed advertising component.

In another embodiment, shadow, highlight and other lighting effects could be used in order to emphasize the advertising component, to create a completely different look for the advertising component.

In order to manipulate the advertising component, the placement zone is tracked as the video material is played, such that each pixel of the initial frame into which the advertising component is to be inserted is tracked through each frame of the video material. For example, if the top right pixel of the advertising component is inserted onto a pixel X of the video material and the pixel X of the video material moves to the left from frame to frame, the top right pixel of the advertising component will also move to the left from frame to frame when inserted, i.e. it moves with the pixel X. The resulting video material and integrated advertising component produces an image in which the advertising component is blended seamlessly into the video material and integrated into the same format.

The invention is not limited to the above mentioned manipulations and additional manipulations may also be performed on the advertising component for example the colour, opacity and/or tone of the advertising component may be altered.

The advertising component can be manipulated using several different processes and software known to persons skilled in the art. For example the post processing software Monet™ could be used in order to manipulate the advertising component at step S216.

Monet™ currently supports QuickTime™ as a movie format, with the QuickTime libraries supplied by Apple™ on Mac™ and Windows™. AVI files created using a codec supported by QuickTime™ can be read by Monet™. In addition various single frame formats can be read and written by Monet™, for example JPEG and TIFF. Embodiments are not limited to such formats and may in addition adopt different known or future formats.

Other movie formats that can be read by Monet™ include, without limitation:
AVI files through the use of DirectShow™ code linking to the LeadTools™ libraries licensed on Windows™;
Raw MPEG files read by QuickTime™ and DirectShow™;
WMV format available in the LeadTools™ libraries; DV (Digital Video) files supported by QuickTime™;
3DPP files written by QuickTime™; and
DivX, an MPEG consumer format usually packaged into an AVI file, which can be read by QuickTime™ and DirectShow™.

Video material preparation tools which can be used include, without limitation:
Autodesk Discreet Cleaner (http://www.autodesk.com/cleaner);
Apple Compressor, provided with Final Cut Pro and HD Studio;
Sorensen Squeeze (http://www.sorensonmedia.com/);
Adobe Encore (http://www.adobe.com/products/encore/); and
Microsoft.

Formats which allow for the insertion of a clickable hyperlink advertising component include, without limitation:
RealNetworks (http://www.realnetworks.com/products/media_players.h™l);
QuickTime™;
Coull Media (http://www.coull.biz/solutions/coull-interact/demonstration/player.php); and
MPEG-4.

One advertising component can be placed into multiple scenes, or several different advertising components could be inserted into different video material, which are all part of the same advertising campaign. In another embodiment different advertising components can be inserted into video material of different formats, which are to be viewed using different electronic devices, such that an advertising component can be viewed on multiple different types of electronic devices.

Following insertion and manipulation of the advertising component, the selected video material is displayed having the advertising component inserted therein at step S218. The user 20 can then approve or reject the integrated video material and advertising component at step S220. In one embodiment the advertising component placement facility provider (online portal services provider 5) can also approve or reject the video material and advertising component. Furthermore, the producer of the video material may also be provided with an opportunity to approve or reject the integrated video material and advertising component.

If the integrated video material and advertising component is rejected by the user 20 at step S220, then the user can elect to return to step S204, step S214 or step S216 in order to reselect video material, insert the advertising component in a different placement zone within the originally selected video material or re-manipulate the inserted advertising component, illustrated by the dotted line D5, D6 and D7 respectively. Alternatively, if the integrated video material and advertising component is rejected by the advertising component placement facility provider (online portal services provider 5) or the video material producer, the reason for its rejection is provided to the user 20, and the user 20 is ask to return to step S204, step S214 or step S216 in order to reselect video material, insert the advertising component in a different placement zone within the originally selected video material or re-manipulate the inserted advertising component, illustrated by the dotted line D5, D6 and D7 respectively.

Step S220 enables the user 20 to approve the placement, quality, duration, appropriateness to campaign, message and or values etc. of the integrated video material and advertising component prior to releasing the integrated video material and advertising component.

In one embodiment the selected video material is displayed without the advertising component next to the selected video material with the inserted advertising component, as illustrated in FIGS. 6A and 6B, so that it is easy for the user 20 to compare the video material. In a further embodiment of the invention, acceptance of the video material and integrated advertising component is acceptance of not only the video material and advertising component, but also acceptance of the cost of placement of the advertising component and the acceptance of any liability. In addition, acceptance may trigger billing of the user 20.

In another embodiment of the invention, the user 20 may be presented with several different alternative integrated video material and advertising components to select from. Furthermore, approval may depend on targeting criteria and performance criteria as measured in the video material league table 16.

Figure 16A:
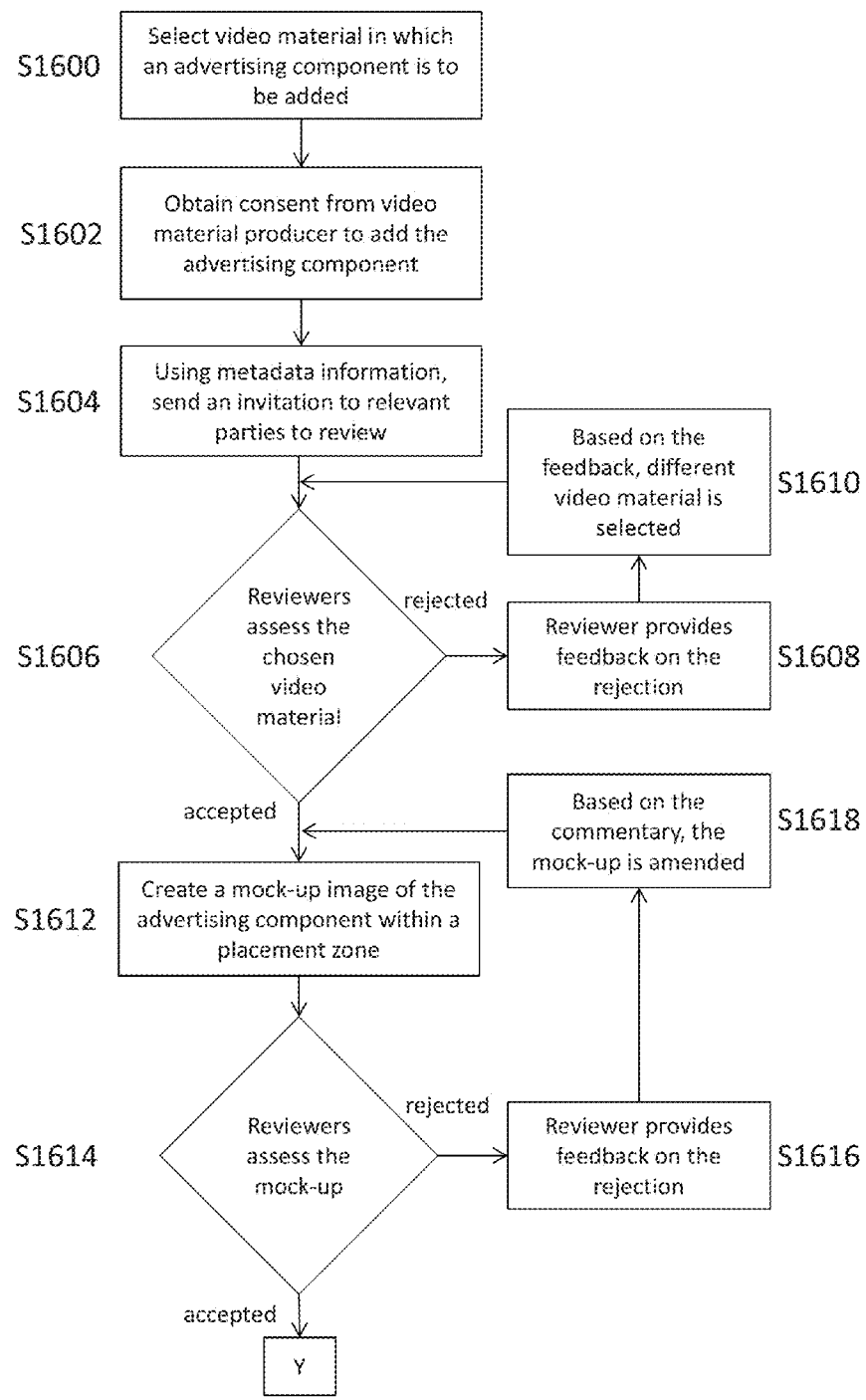
FIGS. 16A and 16B illustrate a flow chart of the approval process of the video material.
Figure 16B:
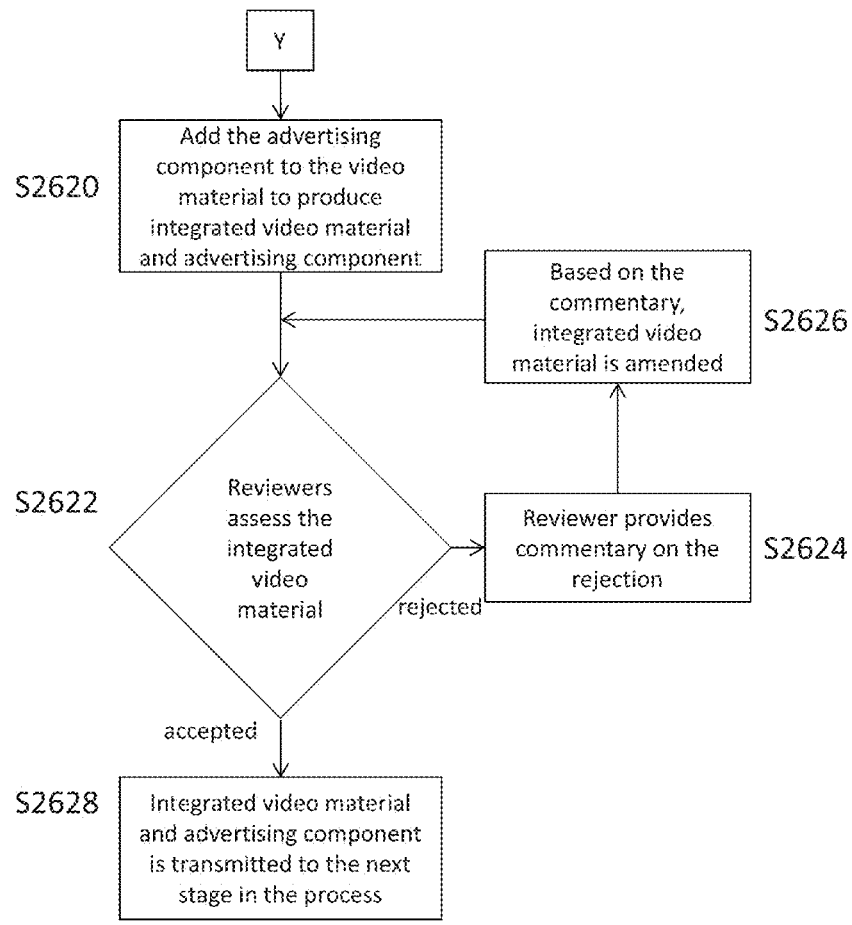

FIGS. 16A and 16B is a flow chart of the stages requiring approval during the process of combining the advertising component with the video material to create the integrated video material and advertising component. The approval process S220 allows a content owner and other key stakeholders visibility of embeds and campaigns in progress and to have the final say in editorial suitability and compliance. This is all facilitated by virtue of key metadata created early on in the process. The metadata comprises information on the identity of the video content producer and the advertiser. Access to review the progress of a campaign, and the right to approve or reject the stages of the video material is assigned based on the metadata. Video material is selected for adding an advertising component S1600 and consent is obtained from the video producer for the video material to have the selected advertising component added S1602. Based on the metadata which comprises information on the identities of the relevant reviewers of the video material, an invitation to review the selected video material is sent S1604. The reviewers then approve or reject the selected video material S1606. If the selected video material is rejected, the reviewer may provide feedback on the rejection S1608, and the choice of video material may be amended based on the feedback S1610. Once video material is approved for use with the chosen advertising component, a mock-up image of advertising component within the placement zone of the video material is produced S1612, and an invitation for the reviewers to approve or reject this is sent S1614. As with the choice of video material, the reviewers have the opportunity to provide feedback on a rejection S1616, and the mock up may be amended based on this feedback S1618. Once approval has been obtained from all reviewers, the advertising component is added to the video material to produce the integrated video material and advertising component S2620. The reviewers are invited to approve or reject this S2622, and provide commentary on any rejections S2624. The integrated video material and advertising component may be amended based on the feedback S2626. Once approval has been obtained from all reviewers, the video integrated video material and advertising component may be transmitted to the quality control hub for review. All stages presented for review may comprise information relevant to the reviewer. For example, there may be multiple advertising components added to one segment of video material, however, reviewers of an advertising component may only see one advertising component within the video material.

Figure 17:
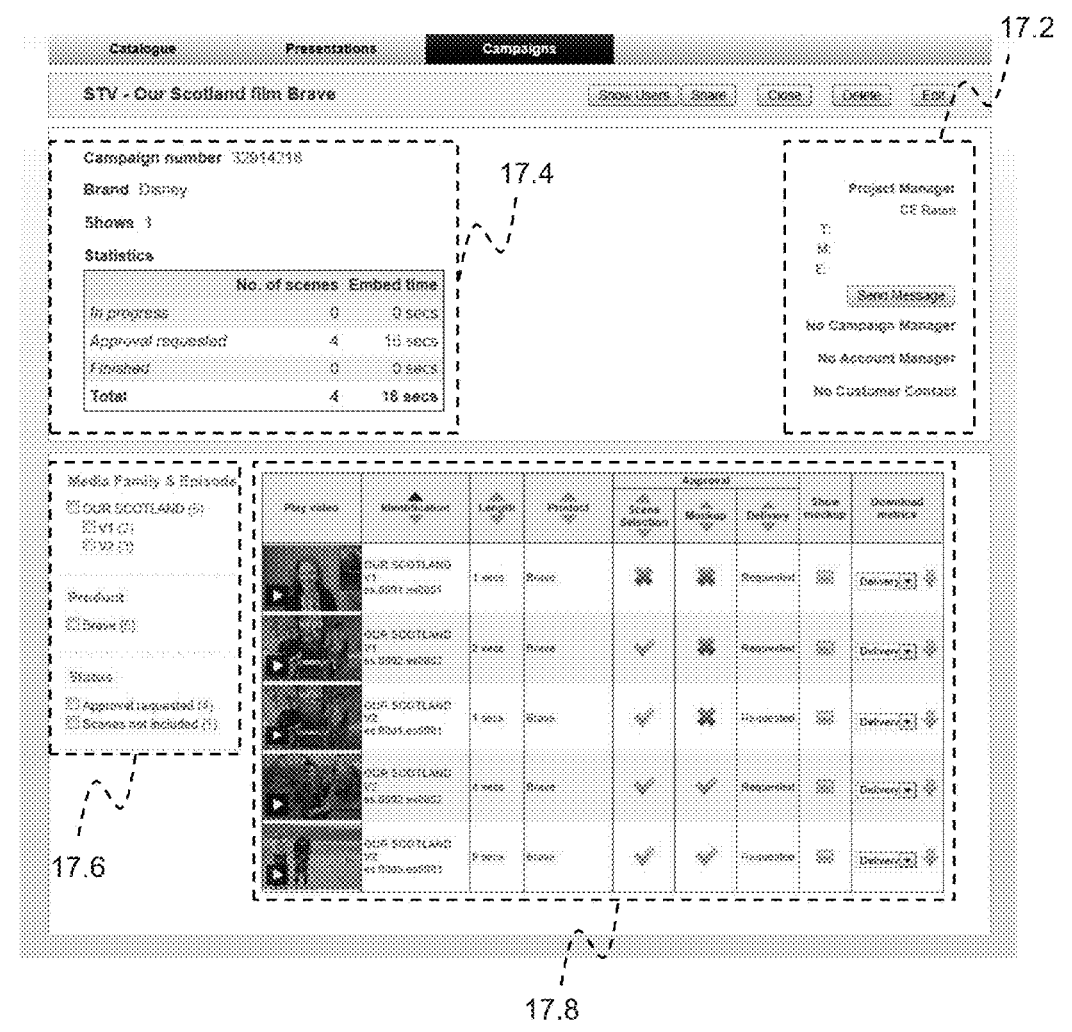

FIG. 17 illustrates an example of the video material presented to a reviewer of an advertising campaign. Information on the project manager, campaign manager, account manager and customer contact 17.2 are presented to the reviewer. The progress of a campaign 17.4 is presented to the user, including the number of scenes that are: in progress, waiting for approval, and finished. The video material that is rejected is still able to be viewed by the reviewer, allowing for comparison with other video material. The review videos 17.8 may be filtered 17.6 based on parameters, such as the advertising component to be added to the video material, the approval status of the video material, and the media family and episode of the video material. The review videos 17.8 may be sorted based on the length of placement zones, the advertising component to be added and its approval status.

Figure 18:
FIG. 18 illustrates an example of a video presented to a reviewer for approval.

FIG. 18 is similar to FIG. 15 and is an example of a presentation of video material to the user. The title block 18.2 displays the title of the program in which the video material is intended to be broadcast, the episode and scene numbers and an image of the video material with placement zone highlighted. For each video material item within the video material catalog 12, the user is able to stream or download the whole scene of video material 18.6, and a cut down version of the scene of video material containing the placement zones only. Metrics of the segment 18.4 are presented, including: length of the scene; length of the placement zone; embed type; locale category; and locale title.

The reviewers have the opportunity to approve or reject the selected video material and provide commentary on their decision. Any rejections or amendment requests are fed straight back into the workflow, thereby maintaining very fast turnaround and scalability when changes are requested.

Figure 19:
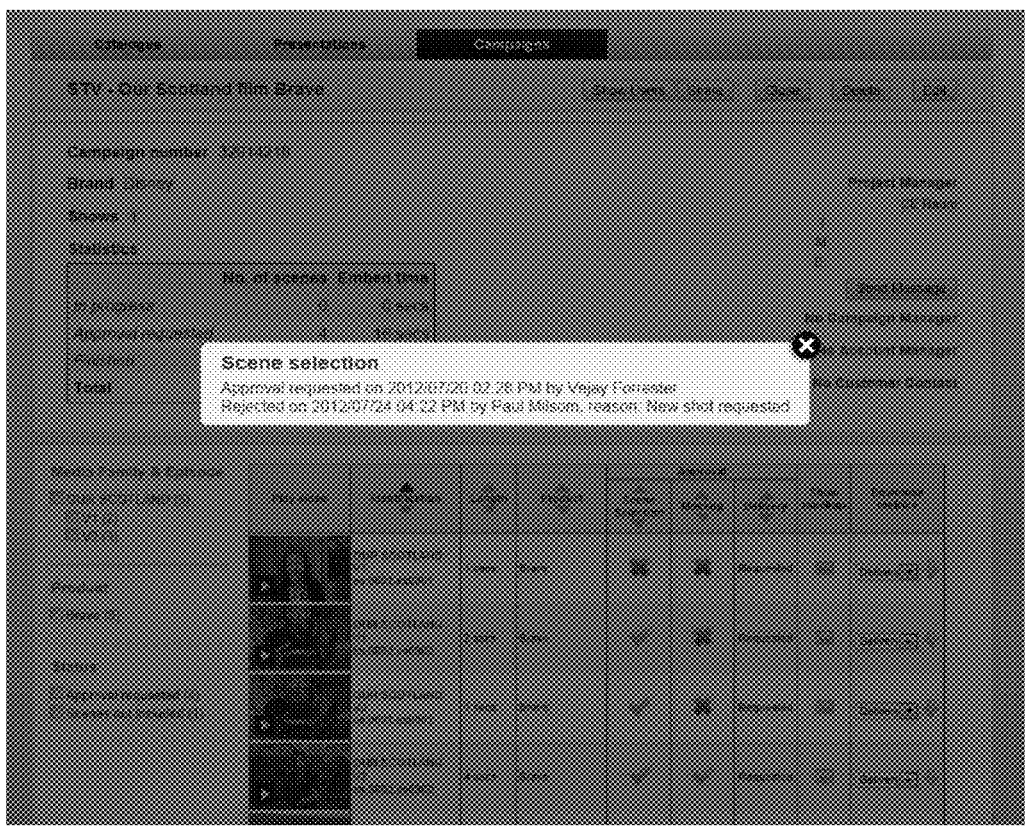
FIG. 19 illustrates an example of the rejection comments provided by the reviewer.

FIG. 19 is an example of a rejection of an identified scene. Details of the rejection are provided, including the time, date and requester of the approval, along with the time, date and the identity of the reviewer.

Providing one of the identified scenes is approved by all parties, a mock-up of the advertising component is added within a placement zone of a frame of the approved scene.

Figure 20:
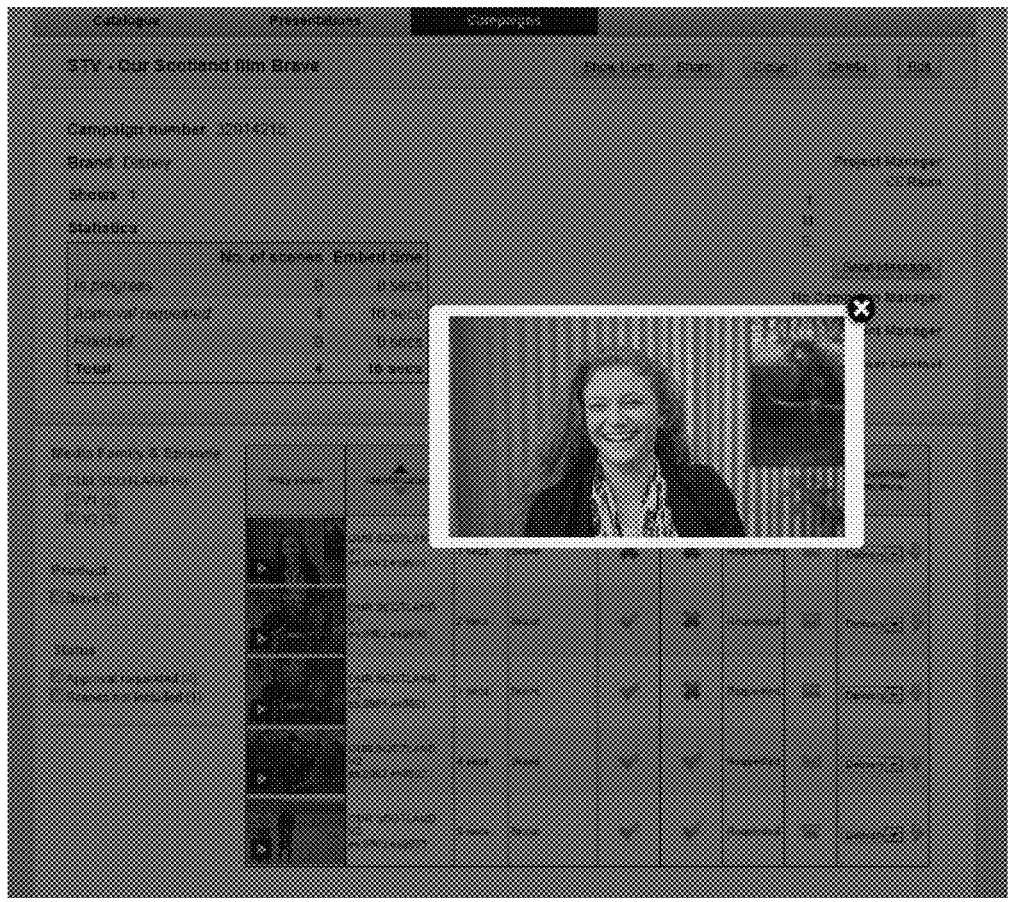
FIG. 20 illustrates an example of a mock-up image for review.

FIG. 20 illustrates an example of a mock-up image for review. In FIG. 20, the advertising component is a poster of the film Brave™. Approval is requested from the reviewers. The reviewers are able to approve or reject the image and provide reasons for the decision.

The approval function within the workflow allows final sign off of integrated video material and advertising component prior to the work being published, ensuring that editorial best practice can be maintained at all times. Every piece of digital placement can be approved online, with all comments, revisions, rejections and acceptances saved in a detailed audit trail. The video material can be sorted into approved and rejected material. The approvals process is integrated into the workflow, ensuring that change requests or revisions are captured and dealt with immediately. Because the entire process of preview and approval is conducted online, there is no requirement to transfer large files, which saves a considerable amount of time, and makes it very easy for approvers to carry out the work at a time to suit them. The permission to approve or reject the video material can be extended to a plurality of parties.

In one embodiment of the invention the user 20 (advertising agency and/or direct advertisers 25) makes a payment to the advertising component placement facility provider (online portal services provider 5) whenever an advertising component is successfully placed into video material and the video material returned to its original location. Furthermore, the user 20 may make a payment to the advertising component placement facility provider (online portal services provider 5) whenever the integrated video material and advertising component is viewed. In a further embodiment, if the advertising component comprises a clickable hyper-link to the advertisers website or web page, the user 20 makes a payment to the advertising component placement facility provider (online portal services provider 5) every time the link is activated by a consumer. A percentage of these payments may be distributed to the video material producers, suppliers and right holder 15, the creative services provider 35, the metrics, valuation and billing services providers 45 and/or the video material distributors 55 as appropriate.

For example, in one embodiment, an advertising agency and/or direct advertiser 25 may make an initial payment to the advertising component placement facility provider (online portal services provider 5) for the placement of an advertising component in video material, and another payment to the advertising component placement facility provider (online portal services provider 5) every time the integrated video material and advertising component is viewed.

In a further embodiment, the advertising component placement facility provider (online portal services provider 5) may receive a percentage of an advertising agencies 25 fee, if the advertising agencies 25 uses the advertising component placement facility provider (online portal services provider 5) to integrate video material and an advertising component.

In another embodiment, the advertising component placement facility provider (online portal services provider 5) may have a revenue share arrangement agreed with the video material producers, suppliers and right holder 15, the creative services provider 35, the metrics, valuation and billing services providers 45 and/or the video material distributors 55 as appropriate.

In another embodiment of the invention a bidding system exists for the most popular video material, such as the most viewed video material. Users 20 representing different advertising components can bid to insert their advertising component in the video material, and the most desirable bidder is successful.

Following acceptance of the integrated video material and advertising component at step S220, the video material and advertising component are stored in the storage device 26. In one embodiment of the invention, the storage device 26 may be the storage device from which the selected video material was retrieved at step S206. Finally, the video material and integrated advertising component are returned to the original location from which the video material was retrieved at step S206, in step S224.

The process and apparatus of the invention is capable of use with multi-format video material. Video material recorded using any one of a plurality of different software is capable of use with the system and apparatus of the invention. The video material is transcoded when retrieved form it original location at step S112 into a format which a capable of use with the system and method of the invention, as described herein before. Then, when the video material is returned to its original location, the video material is transcoded into the appropriate original format having the same tag and address as the video material had prior to it being retrieved from its original location at step S206. Furthermore upon return of the video material and integrated advertising component to the video material original location at step S224 the distributor system of the video material is notified. Alternatively, the video material and integrated advertising component may be sent to a different location for distribution.

In one embodiment of the invention it is possible to insert more than one advertising component in the same video material. For example, if there are two or more placement zones in a video material, then two or more advertising components (from the same of different advertisers) may be inserted into the video material. In one embodiment an advertising component may be inserted into a placement zone in the background of a video material and another advertising component may be inserted into a placement zone in the foreground of the video material.

In another embodiment, an advertising component may be inserted into a video material in respect of only one country or region, such as America, then a different advertising component may be inserted into the video material, in the same or a different placement zone, in respect of a different country or region such as Great Britain. A region may be a subsection (state/county) of a country, such as Texas. Alternatively, a region may be a group of countries such as Europe.

If different advertising components are inserted into the same video material in respect of certain countries or regions only, then a database can be created for the video material detailing the different advertising components which are to be inserted into the video material and the countries or regions to which each different advertising component applies.

In the embodiments of the invention described above the advertising component is inserted into the placement zone of the video material, manipulated and then the integrated video material and advertising component are returned to the video materials original location. The integrated video material and advertising component can then be viewed via an electronic device such as, for example, personal computers, digital television set-top boxes, mobile telephones, personal digital assistances (PDA's), gaming systems and/or MP3 players. However, if the advertising component is a dynamic advertising component, as described above, such that the advertising component is to be inserted in respect of only a particular region/country, or if the advertising component is to be altered depending on the viewing consumer (described in further detail below), it is possible to send the video material separately from the dynamic advertising component to a targeter, such as illustrated in FIG. 10A.

Figure 10A:
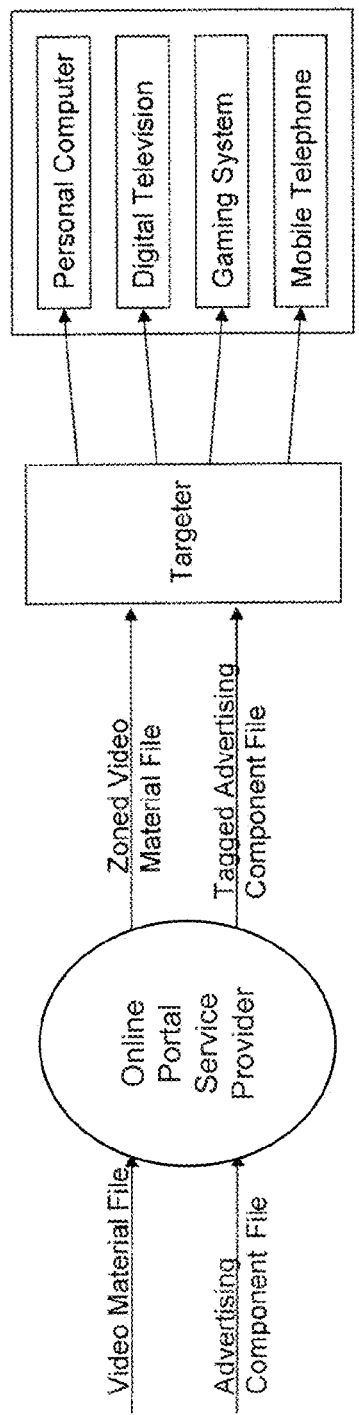
FIG. 10A illustrates an embodiment of the invention where a zoned video material file and a tagged advertising component file are sent to a video material distributor.

FIG. 10A illustrates the arrangement where a video material file and a dynamic advertising component file are input to the online portal services provider 5, and a zoned video material file and a tagged dynamic advertising component file are sent to a video material distributor 55 (targeter). The tagged advertising component file is a processed format of the advertising component file and includes instruction for integration of the advertising component file into the video material file, such as which placement zone the advertising component is to be inserted into, and how the advertising component is to be manipulated. The zoned video material file is a processed format of the video material file and includes at least one placement zone.

The targeter combines the zoned video material file and the tagged dynamic advertising component file prior to sending the integrated video material and advertising component to the correct type of electronic device. This method of sending data, streams the data such that it is bandwidth friendly. It is also advantageous if, for example, the advertising component is to be changed depending on the viewing region or the viewer.

Figure 10B:
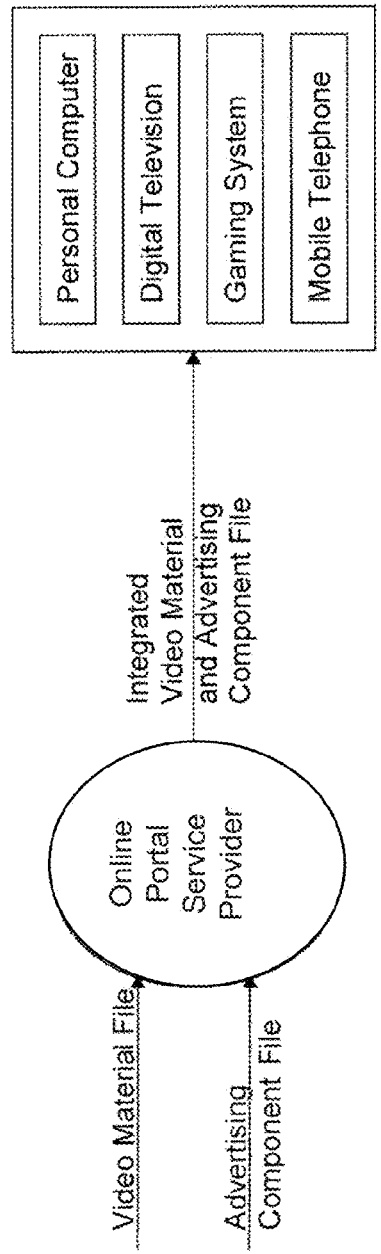
FIG. 10B illustrates an embodiment of the invention where an integrated video material and advertising component file sent to a video material distributor.

FIG. 10B illustrates an embodiment of the invention where a video material file and a static advertising component file are input to the online portal services provider 5. The online portal services provider 5 combines the video material file and the static advertising component file to create an integrated video material and advertising component file. The integrated video material and advertising component file is then sent to the electronic devices via a video material distributor 55 (not illustrated). This arrangement is not bandwidth friendly as the integrated video material file and advertising component file is larger than the separate zoned video material file and a tagged dynamic advertising component file. Furthermore, this arrangement is not live broadcast friendly as the advertising component must be inserted into the video material prior to broadcast. Furthermore, since the video material and advertising component are combined prior to distribution, multiple file versions of the integrated video material and advertising component must be sent to the broadcaster, as a different file version may be required depending on the viewing region or the viewer. Consequently multiple streams of data must be sent from the online portal services provider 5 to the video material distributor 55.

The process illustrated in FIGS. 7 and 8 enables advertising components to be inserted into video material, following recording of the video material. In this way advertising revenue can be generated from pre-recorded video material without deteriorating the consumers viewing pleasure by inserting spliced advertising components. Furthermore, the process illustrated in FIGS. 7 and 8 enables advertising components to be inserted into, for example, back catalogs of films or television programs.

In one embodiment of the invention the process illustrated in FIG. 7 can be modified to include a further step S300 of obtaining video material viewer data from a video material viewer data provider 28. Video material viewer data is demographic data determined about the viewers of the video material, such as the average age of the viewers.

Consumers of electronic devices such as for example, personal computers, digital television set-top boxes, mobile telephones, personal digital assistances (PDAs), gaming systems and/or MP3 players are in most instances required to login and/or register the device. Consequently, it is possible to obtain data, such as, for example, the sex, age, and profession etc. of the consumer. This data can then be obtained from the electronic device when the consumer views video material using their electronic device.

In addition, it is possible to use the electronic devices in order to monitor which video material a consumer views, and consequently determine data about the consumer such as the genre of video material the consumer most frequently views.

Figure 11:
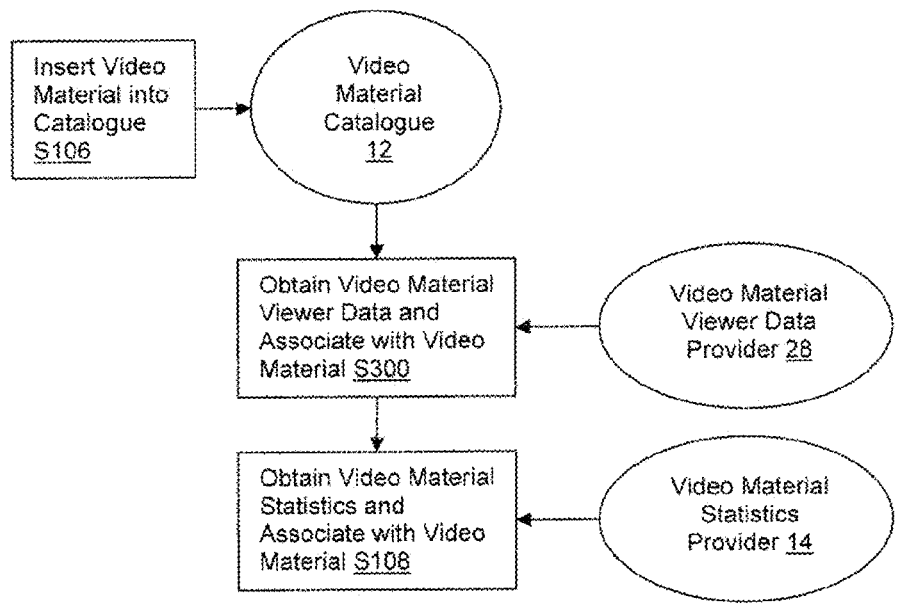
FIG. 11 illustrates a further embodiment of the process of FIG. 7.

FIG. 11 illustrates part of the process illustrated in FIG. 7 modified to include the additional step S300 of obtaining video material viewer data from a video material viewer data provider 28. The step S300 is inserted between the step S106 of inserting the video material into the video material catalog 12 and the step S108 of obtaining video material statistics data from the video material statistics provider 14.

It is also possible to insert the step S300 between the step S102 of inserting the video material into the video material inventory 10 and the step S108 of obtaining video material statistic data from the video material statistics provider 14. This arrangement can be used when a video material catalog 12 is not created, such as the arrangement illustrated by the dotted line D2.

Figure 12:
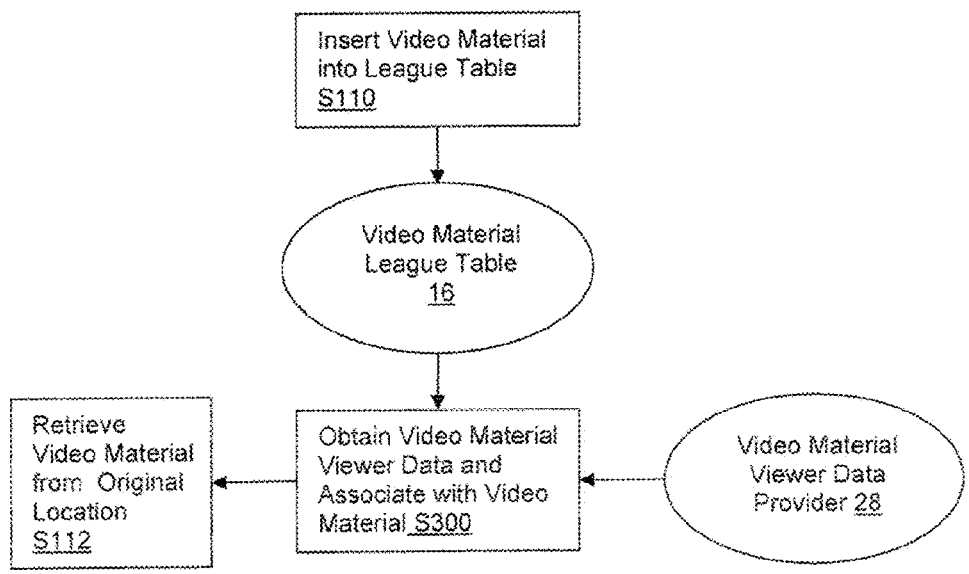
FIG. 12 illustrates a further embodiment of the process of FIG. 7.

FIG. 12 illustrates an alternative arrangement of part of the process illustrated in FIG. 7 modified to include the additional step S300 of obtaining video material viewer data from a video material viewer data provider 28. The step S300 is inserted between the step S110 of inserting the video material into the video material league table 16 and the step S112 of retrieving the video material from its original location.

Additional step S300 enhances the process of the invention as a user 20 who inserts an advertising component in video material can select the video material based on the viewer data. For example, if the user 20 is required to insert an advertising component for a brand of shaving gel, the user 20 may wish to select a video material which is viewed predominantly by men between the ages of 18 and 40. Therefore, the user 20 can review the video material viewer data in order to determine which video material(s) are viewed predominantly by men between the ages of 18 and 40, select that video material and insert the advertising component. In this way an advertising component can be inserted into a video material in order to target a specific type of consumer.

In a further embodiment of the invention it is possible for several different advertising components to be inserted into the same placement zone of the same video material. For example, a video material may be equally popular with men and women of different ages. Therefore, a user 20 may insert a first advertising component into the video material such that the first advertising component will be displayed in the video material whenever it is determined from the video material viewer data that the viewer is a woman. In addition, a different or the same user 20 may insert a different second advertising component into the video material such that the second advertising component will be displayed whenever it is determined from the video material viewer data that the viewer is a man. Accordingly, an advertising component can be further targeted at a specific type of consumer. In this instance the process illustrated in FIG. 10A is preferable, where a dynamic advertising component are inserted "on the fly", rather than a plurality of video material and integrated advertising components being generated, each of the plurality of video material and integrated advertising components comprising a different advertising component.

Statistics of the broadcasted video material are compiled, providing user access to all campaign performance data, searchable by brand, campaign, program content or data range. This allows monitoring of a campaign's performance, with a wide range of customizable reporting options. This consolidates and reconciles all of the audience and impression figures for a campaign, integrating with metrics provision sources automatically and using data which is either supplied by the advertiser or by independent audience research groups. All types of media, including broadcast, online and video-on-demand, can be consolidated and managed centrally. This allows for the comparison of the campaigns performance against its desired goals.

Although the above description refers to a user 20 (advertising agency or direct advertiser 25) selecting and inserting the advertising component, it is possible for the advertising component to be inserted into the video material at step S214 and manipulated at step S216 by the advert placement facility provider (the online portal services provider 5).

Figure 13:
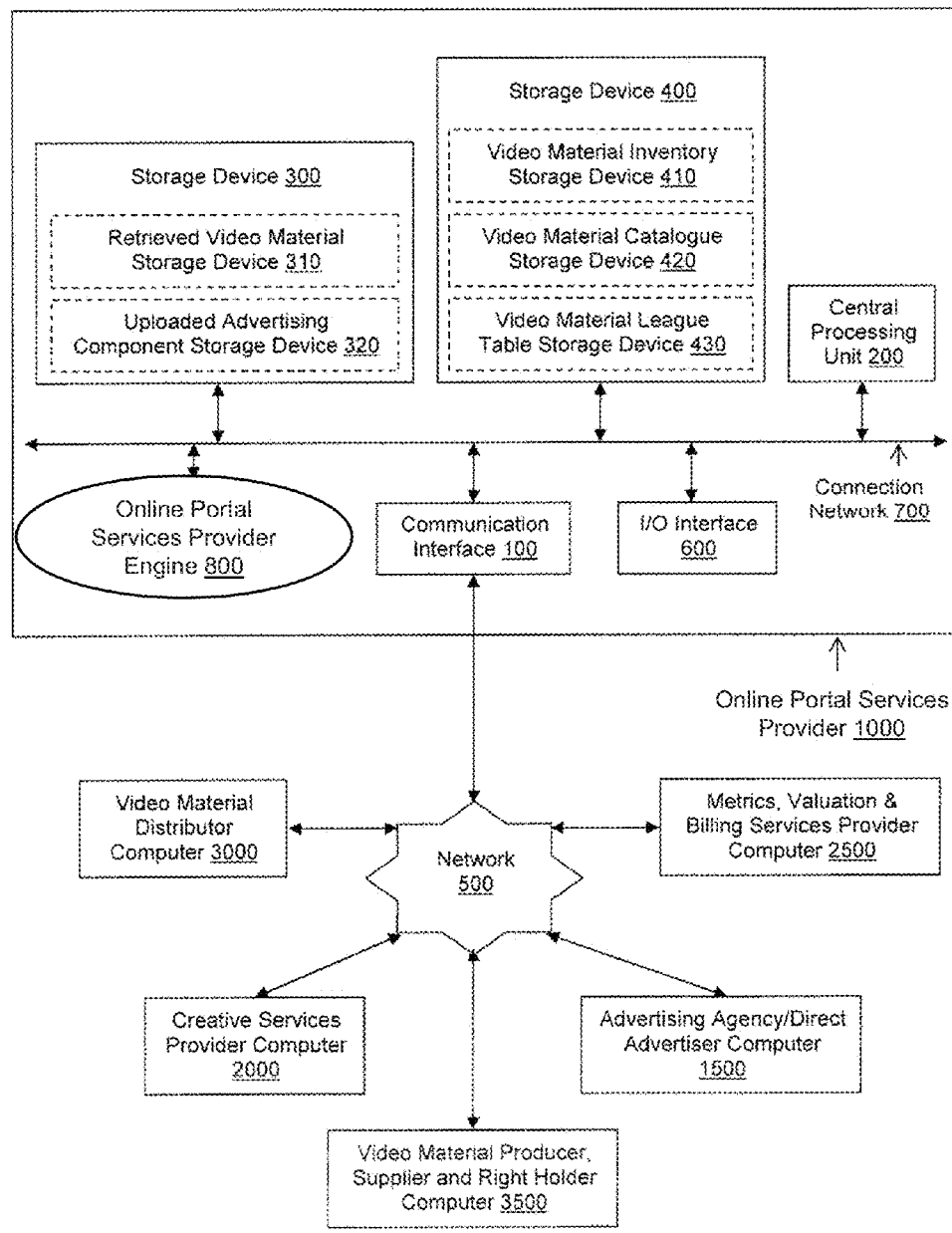
FIG. 13 illustrates a server for performing the process of the invention.

FIG. 13 illustrates an exemplary computing device 1000 such as an advertising component placement facility provider (online portal services provider 5) server, which is used to perform the above mentioned processes.

The computing device 1000 comprises a communication interface 100, a central processing unit 200; storage devices 300 and 400 an input/output interface 600, and an online portal services provider engine 800 operatively coupled by a connection network 700, illustrated in FIG. 13. The connection network 700 may be an electrical bus, an optical network, switch fabric or any other suitable interconnection system.

The online portal services provider server 1000 is connected over a network 500 to at least one advertising agency/direct advertiser computer 1500; at least one creative services provider computer 2000; at least one metrics, valuation and billing services provider computer 2500; at least one video material distributor computer 3000; and at least one video material producers, suppliers and right holders computer 3500. The network 500 may be for example the internet.

The central processing unit 200 controls the advertising component placement facility provider server 1000 and may be a conventional microprocessor.

The storage device 300 is a temporary storage device and comprises a retrieved video material storage device 310 and an uploaded advertising component storage device 320. The storage device 400 comprises a video material inventory storage device 410, a video material catalog storage device 420, and a video material league table storage device 430. Although the storage devices 300 and 400 are illustrated as separate storage devices, one storage device may be used to store all the data. Alternatively, such devices as mentioned herein may be distributed over different servers or systems.

The temporary storage device 300 may be, for example one or more conventional random access memory (RAM) devices, Flash memory devices, and/or electrically erasable programmable read only memory (EEPROM) devices. Furthermore, although the storage device 300 is described herein as a temporary storage device, in other embodiments the storage device 300 may be a permanent storage device.

The communications interface 100 provides a bidirectional data communication coupling for the online portal services provider server 1000. The communication interface 100 can be functionally coupled to the network 500. In one embodiment, the communications interface 100 provides one or more input/output ports for receiving electrical, radio frequency, or optical signals and converts signals received on the port(s) to a format suitable for transmission on the connection network 700. The communications interface 100 can include a radio frequency modem and other logic associated with sending and receiving wireless or wireline communications. For example the communications interface 100 can provide an EtherNet interface, Bluetooth and/or wireless capability for the computing device 1000.

Operation of the exemplary online portal services provider server 1000 will now be described with reference to the process illustrated in FIG. 7.

Video material is identified as suitable in step S100 and at least a pointer to the video material is stored in the video material inventory storage device 410. In one embodiment the video material files itself is stored. As stated above the step of identifying video material may be performed by any person who has the authority to determine whether the video material is suitable. Following storage of a relevant pointer or video material in the video material inventory storage device 410, the video material is allocated at least one category and is stored in the video material catalog storage device 420.

Next video material statistics are obtained from the video material statistics provider 14 (the at least one metrics, valuation and billing services provider computer 2500). The video material statistics can be associated with the video material by a person. Alternatively, the CPU 200 may associate the relevant pointer or video material statistics with the video material stored in the video material inventory storage device 410 or the video material catalog storage device 420 in accordance with instructions from the online portal services provider engine 800. In one embodiment, the CPU 200 associates the correct statistics to the correct video material based on a unique identifier associated with each video material and the statistics and stores the video material in the video material league table storage device 430. The above steps can in principle be performed without necessarily bringing a version of the video material onto the system. For example, a web friendly representation of the video material or a pointer to the video material may be stored in the video material inventory storage device 410.

To process the video material a version of the video material is required to be retrieved. Consequently, the identified video material is retrieved from a relevant location, from the video material producers, suppliers and right holders computer 3500 for processing. The online portal services provider engine 800 instructs the CPU 200 to retrieve the video material from the relevant location via the communication interface 100 and the network 500. The retrieved selected video material is then stored in the retrieved video material storage device 310 by the CPU 200. The retrieved video material is examined by the CPU 200 in accordance with instructions from the online portal services provider engine 800 to determine if there is at least one placement zone in the video material. The video material is scanned to locate any area within the video material which can be tracked reliably, as it is in view for at least a minimum predetermined period of time and is of at least a minimum predetermined area. Following identification of at least one placement zone, a place holder generated by the CPU 200 is inserted in the detected placement zone. The video material is then stored in a storage device by the CPU 200. At this point the zoned video material may be placed in the storage device 310, with a pointer to it in the (or each of) the inventory, catalog, and league table. Searchable information relating to the video material may be associated with the video material or pointer in any one of the inventory, catalog, and league table. Finally, the identified video material is returned to its original location with the place-holder(s) via the communication interface 100 and the network 500.

Operation of the online portal services provider server 1000 will now be described with reference to the process illustrated in FIG. 8.

A user 20 (advertising agency/direct advertiser) enters the advertising component placement facility 22 at step S200. The advertising agency/direct advertiser computer 1500 is able to communicate with the online portal services provider server 1000 via the network 500. The user is displayed selected contents of the video material inventory storage device 410 and/or the video material catalog storage device 420 and/or the video material league table storage device 430 as appropriate via the front end server 4000.

The user 20 selects at least one pre-processed zoned video material for the placement of an advertising component at step S204. A signal indicating which video material has been selected is sent from the user to the online portal services provider server 1000. The online portal services provider engine 800 then instructs the CPU 200 to retrieve the selected video material from its original location and store it in the retrieved video material storage device 310. Furthermore, the user 20 uploads an advertising component from the advertising agency/direct advertiser computer 1500 or the creative services provider computer 2000 to the online portal services provider sever 1000 via the network 500 and the communication interface 100. The online portal services provider engine 800 causes the uploaded advertising component to be stored in the uploaded advertising component storage device 320.

Upon instruction from the online portal services provider engine 800 the CPU 200 retrieves the video material from the retrieved video material storage device 310 and the advertising component from the uploaded advertising component storage device 320 and inserts the advertising component onto the place holder in the selected video material, so that the advertising component is arranged in the placement zone of the video material.

Following insertion of the advertising component into the selected video material, the advertising component is then manipulated. The user manipulates the video material using known software technology, which resides in the online portal services provider engine 800. The online portal services provider engine 800 instructs the CPU 100 to manipulate the advertising component. The manipulation involves the integration of the advertising component with the digital operating format of the video material by means of tracking the digital image information of the video material. This produces a video material integrated with the advertising component in the operating format. Following manipulation of the advertising component, the user is given an opportunity to view the integrated video material and advertising component via the network 500 and to approve the video material and advertising component. If the video material and advertising component is approved, the CPU 200 is instructed to store the video material and advertising component in a storage device and return the video material and advertising component to its original location for distribution via the video material distributor computer 3000.

In alternative embodiments hardwired circuitry may be used in place of or in combination with software instructions to implement aspects of the invention. Thus, embodiments of the invention are not limited to any specific combination of hardware circuitry and/or software disclosed herein.

An advantage of the process and apparatus of the invention is that an advertising component, once placed can reach a wider audience than previously achievable using conventional advertising methods. Consequently, the revenue generated by the placement of an advertising component using the process and apparatus of the invention can be increased.

Furthermore, the process and apparatus of the invention enables an advertising component to be more accurately targeted at specific consumers than previously achievable. Consequently, the revenue generated by the placement of an advertising component using the process and apparatus of the invention can be increased.

In addition, the process and apparatus of the invention enables a video material to have multiple different advertising components, such as a different advertising component for a different region or country, or different advertising component depending on who the viewing consumer is. Consequently, the same placement zone can be sold multiple times, increasing the amount of revenue which can be generated by the process and apparatus of the invention.

Another advantage of the process and apparatus of the invention is that advertising components can be placed by smaller brand holders regionally as well as by larger global brand holders. Furthermore, video material which already exists can be rejuvenated to generate revenue, by the inclusion of advertising components, such as back catalogs of films and television programs.

Another advantage of the process and apparatus of the invention is that the insertion of advertising components into video material is non-intrusive and therefore does not disrupt the consumers viewing pleasure.

Those skilled in the art will appreciate that while the foregoing has described what is considered to be the best mode and, where appropriate, other modes of performing the invention, the invention should not be limited to the specific configurations and methods disclosed in this description of the preferred embodiment. Those skilled in the art will recognize that the invention has a broad range of applications in many different types of advertising, and that the embodiments may take a wide range of modifications without departing from the inventive concept as defined in the appended claims.

Figure 21:
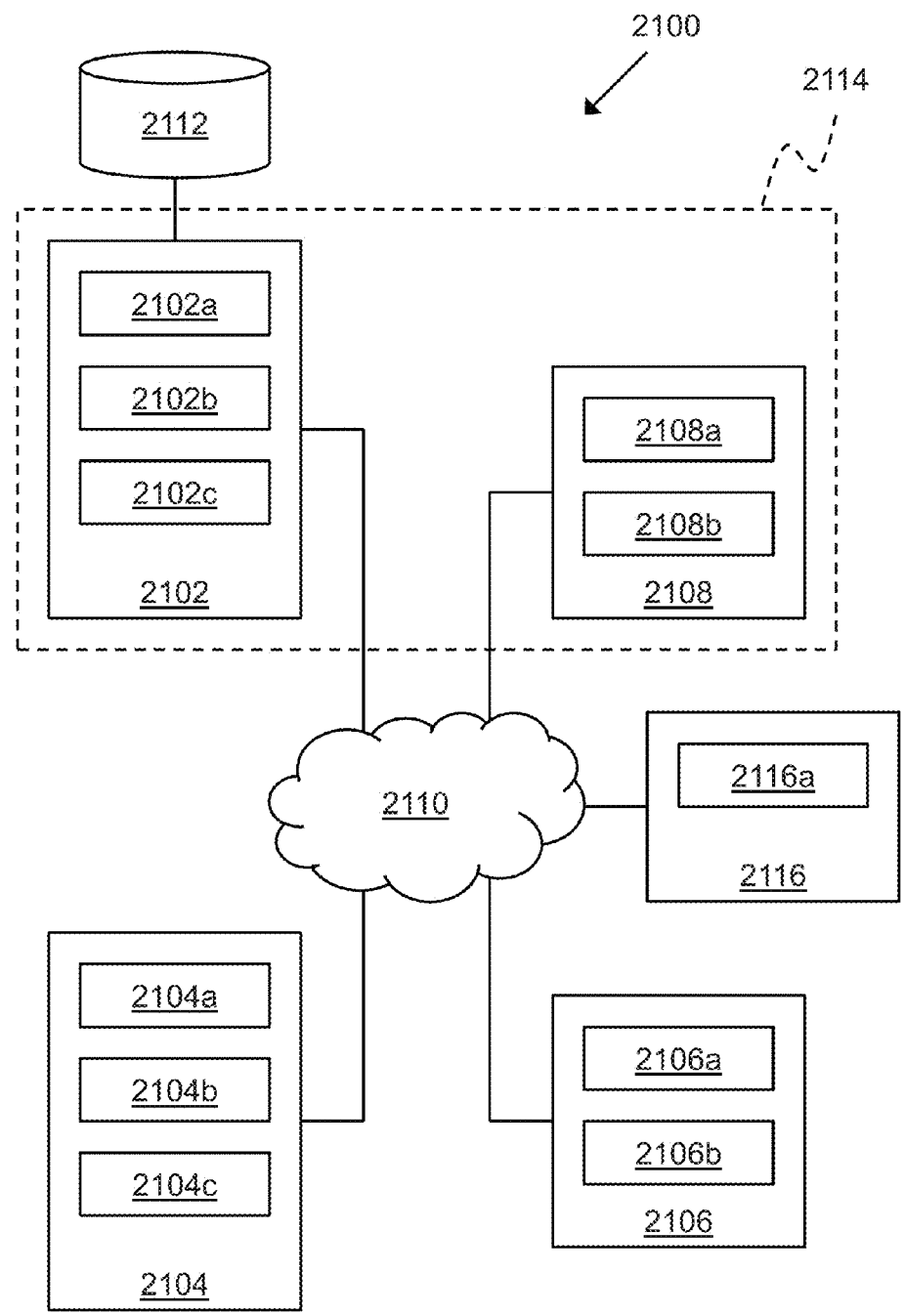
FIG. 21 is a schematic diagram showing a system in accordance with some embodiments.

FIG. 21 is a schematic diagram showing a video processing system 2100 in accordance with some embodiments.

The video processing system 2100 includes four sub-systems 2102, 2104, 2106, 2108 (referred to herein as "hubs"). Each hub performs one or more video processing tasks or functions within the video processing system 2100. Each hub 2102, 2104, 2106, 2108 is situated in one or more geographical locations. In some embodiments, each of the hubs 2102, 2104, 2106, 2108 comprises computer hardware which has access to a local data storage system and preferably a cluster of Graphics Processing Unit (GPU)-enabled computers for video processing. It is known that video processing can be carried out on alternatives to GPUs and embodiments of the invention should not be limited to carrying out the video processing on GPUs only.

Each hub 2102, 2104, 2106, 2108 is connected to one or more other of the hubs 2102, 2104, 2106, 2108 via one or more data communication networks 2110. In some embodiments, the hubs 2102, 2104, 2106, 2108 are connected to each other via the Internet. The hubs 2102, 2104, 2106, 2108 may each be located on a different Local Area Network (LAN). The LANs may be interconnected by a Virtual Private Network (VPN); a private network that uses the one or more data communication networks 2110 to connect the hubs 2102, 2104, 2106, 2108 together securely over a potentially insecure network such as the Internet. Alternatively, some or all of the hubs 2102, 2104, 2106, 2108 may be interconnected using leased lines or other private network connections.

Hub 2102, which is referred to herein as the "source" hub, performs, amongst other things, video data capture and video data analysis in the video processing system 2100.

The source hub 2102 may retrieve video material as one or more digital files, supplied, for example, on video or data tape, on digital versatile disc (DVD), over a high-speed computer network, via the network 2110, on one or more removable disc drives or in other ways.

The source hub 2102 may be located on the same LAN as a media asset management server system 2112 associated with a video content provider. This allows data transfer between the media asset management server system 2112 and the source hub 2102 to benefit from the speed and security of a LAN-based connection, rather than potentially suffer the limited bandwidth and access latency common with Internet data transfers.

In some embodiments, the source hub 2102 comprises a video data analysis module 2102a, which performs pre-analysis in relation to video material. Such analysis may be performed using appropriate software which allows products to be placed digitally into existing video material.

The pre-analysis may be fully automated in that it does not involve any human intervention.

In some embodiments, the video data analysis module 2102a is used perform a pre-analysis pass in relation to the video material to identify one or more segments in the video material. This may involve using shot detection and/or continuity detection which will now be described in more detail.

Pre-analysis may comprise using a video format detection algorithm to identify the format of the video material, and if necessary, convert the video material into a format capable of receiving one or more additional video objects.

Pre-analysis may comprise using a shot detection function to identify the boundaries between different shots in video data. For example, the video data analysis module 2102a automatically detects "hard" and "soft" cuts between different shots, which correspond to hard and soft transitions respectively. Hard cuts correspond to an abrupt change in visual similarity between two consecutive frames in the video data. Soft cuts correspond to the beginning or the end of a soft transition (for example wipe and cross fading transitions), which is characterised by a significant but gradual change in visual appearance across several frames.

Pre-analysis may comprise using a continuity detection function to identify similar shots (once detected) in video data. This can be used to maximize the likelihood that each (similar) shot in a given scene is identified—this may be a benefit in the context of digital product placement. For each detected shot, a shot similarity algorithm detects automatically visually similar shots within the video material. The similarity detection is based on matching between frames, which captures an overall global similarity of background and lighting. It may be used to identify shots which are part of a given scene in order to speed up the process of selecting shots that should be grouped together on the basis that they are similar to each other.

Pre-analysis may comprise using an object and/or locale template recognition function and/or a face detection and recognition function. Object template recognition involves identifying objects which reappear across, for example, multiple episodes of a television program, and which are appropriate for digital product placement, so that they can automatically be found in other episodes of the program. Locale template recognition allows a template to be built for a certain locale in a television program and automatically detect the appearance of the locale in subsequent episodes of the program. A locale is a location (e.g. a room) which appears regularly in the program across multiple episodes. Face detection and recognition involve identifying characters which, for example, reappear across multiple episodes of a television program. This allows for characters to be associated with a particular digital product placement.

Pre-analysis may comprise using a tracking (such as 2D point tracking) function to detect and track multiple point features in video data. This involves using a tracking algorithm to detect and track feature points between consecutive frames. Feature points correspond to locations within an image which are characteristic in visual appearance; in other words they exhibit a strong contrast (such as a dark corner on a bright background). A feature is tracked by finding its location in the next frame by comparing the similarity of its neighbouring pixels.

Pre-analysis may comprise using a planar tracking function to follow image regions over time and determine their motion under the assumption that the surface is a plane. This may involve tracking 2D regions defined by splines, calculating their 2D translation, rotation, scale, shear and foreshortening through the video data. This process creates motion information that can be exploited by other video analysis functions.

Pre-analysis may comprise using a motion-from-features detection function which involves using the tracked 2D points to determine 2D motion in the video data. Given a set of tracked feature points, motion-from-features detection involves detecting which points move together according to the same rigid motion.

Pre-analysis may comprise using a 3D tracking function which involves using the tracked 2D points to determine 3D motion in the video data. 3D tracking involves extracting geometric information from a video shot, for example the camera focal distance, position and orientation as it moved. The other information recovered is the 3D shape of the viewed scene, represented as 3D points.

Pre-analysis may comprise using an autokeying function to separate background and foreground areas, allowing products to be digitally placed while respecting any occluding (foreground) objects to provide a natural-looking embedded image. When a foreground object moves in front of the background where it is desired to place a product digitally, the area into which the product is to be placed should stop at the boundary between the foreground and background areas. In general, the digitally placed product should cover the "mask" area of the background data. The correct mask can be especially difficult to create when the edge of the foreground object is very detailed or blurred. The autokey algorithm uses the planar tracker to create motion information so that known background or foreground areas can be propagated forwards and backwards through the video in time.

Pre-analysis may comprise region segmentation which is used to split the video data into regions that span both time and space. Region segmentation involves using an algorithm that detects regions of similar pixels within and across frames of a given video scene, for example to select point features for motion estimation.

Pre-analysis may comprise using a black border detection function, which is used to find the borders around the video image part of video data. This involves using an algorithm that detects the presence of black bars around the frames in a video sequence, which can interfere with various video processing algorithms.

Pre-analysis may comprise proxy creation, which involves creating a lower resolution and/or compressed version of the video material.

The source hub 2102 also comprises a segment sorting module 2102b, which is used to sort the identified segments in the video material.

As explained above, the video data analysis module 2102a may be used to identify the shots in the video material and to find similar shots once the shots have been identified. The segment sorting module 2102b is used to group identified segments together, for example on the basis that they all share one or more common characteristics. The segment sorting module 2102b may group identified segments together on the basis that they all correspond to a given scene in the video material (even if they were dispersed throughout the video material originally). Other suitable characteristics may include a common object, locale or suchlike.

The source hub 2102 also comprises a digital product placement assessment module 2102c, which is used to identify and assess opportunities for digital product placement into the video material. Identifying and assessing opportunities may involve human interaction. Identifying and assessing may comprise one or more of:

identifying opportunities for digital product placement;
creating a mock-up of some or all of the video material with one or more digitally placed products;
rendering preview imagery for the opportunity for digital product placement, for example with blue boxes indicating where the product could be digitally placed; and
generating an assessment report.

Place holders are added to the identified opportunities to mark them as placement zones for the advertising component.

Hub 2104, which is referred to herein as the "creative" hub, is used for creative work in the video processing system 2100. The creative hub 2104 is provided with appropriate creative software for use in the creative process.

The creative hub 2104 comprises a tracking module 2104a, which may be part of the creative software. The tracking module 2104a may be used to determine how the position of a digitally placed product should vary when added into video material, for example to take into account any movement of the camera that recorded the video material. Tracking may be automated and/or may involve human intervention.

The creative hub 2104 also comprises a masking module 2104b, which may be part of the creative software. The masking module 2104b is used to assess how to handle occlusion (if any) of a product to be digitally placed in video material having regard to other objects that may already be present in the video material. Masking assessment may be automated and/or may involve human intervention.

The creative hub 2104 also comprises an appearance modeling module 2104c, which may be part of the creative software. The appearance modeling module 2104c is used to provide a desired appearance in relation to the digitally placed product, for example using blur, grain, highlight, 3D lighting and other effects. Appearance modeling may be automated and/or may involve human intervention.

Since the creative process uses artistic and image manipulation skills, the creative hub 2104 may be located near to a pool of such labor skills. The geographical split between the source hub 2102 and the creative hub 2104 thus provides an efficiency benefit, whilst still minimizing the risk of piracy by controlling what and how video is transmitted outside of the source hub 2102.

Hub 2106, which is referred to herein as the "quality control" (QC) hub performs quality control in the video processing system 2100. Testing and review of video material or associated data created by the creative hub 2104 is performed at the QC hub 2106. The QC hub 2106 may be geographically located remote from both the source hub 2102 and the creative hub 2104. The QC hub 2106 is provided with appropriate quality control software for use in the quality control process.

The QC hub 2106 comprises a rendering module 2106a, which is used to render video material. Rendering may be fully automated.

The QC hub 2106 also comprises a visual QC module 2106b, which is used to play back video material for QC purposes and enables a viewer to approve or reject the video material being viewed from a QC perspective.

Hub 2108, which is referred to herein as the "distribution" hub, distributes video content in the video processing system 2100. The distribution hub 2108 is provided with appropriate software for use in the video distribution process.

The distribution hub 2108 comprises a rendering module 2108*a*, which is similar to the rendering module 2106*a* of the QC hub 2106.

The distribution hub 2108 comprises a reconforming module 2108*b*, which is used to combine video material together and will be described in more detail below. Reconforming may be fully automated using the reconforming module 2108*b*.

In some embodiments, the distribution hub 2108 is provided in the same geographic location(s) as the source hub 2102, and in some instances may comprise at least some of the same hardware. This logical coupling of the source hub 2102 and the distribution hub 2108 is indicated by a dashed box 2114 in FIG. 21. It will be appreciated, however, that the source hub 2102 and the distribution hub 2108 could be logically separate entities which are not geographically co-located.

The video processing system 2100 also includes an online portal 2116 which may comprise one or more cloud-based application servers. Data associated with a project may be uploaded to the online portal 2116 to facilitate access to the data, for example by clients. The online portal 2116 comprises a portal 2116*a* which provides access to the project data. The project data may comprise, for example, segment selection report data (produced by the segment sorting module 2102*b*), digital product placement assessment report data (produced by the digital product placement assessment module 2102*c*) and a mock-up of video material with a digitally placed product (produced by the digital product placement assessment module 2102*c*).

By providing a set of hubs in this way, different stages of a video processing project can be carried out in a distributed manner across different regions or territories, using high speed Internet connections or other types of connections to communicate relevant data between these regions or territories. The video processing system 2100 scales well for the optimal deployment of hardware systems.

The video processing system 2100 may include a plurality of source hubs 2102, for video data capture and analysis within the video processing system 2100. A given source hub 2102 may conveniently be located geographically close to a given video data provider or owner. Thus, a source hub 2102 could be situated in one geographical area, and another source hub 2102 could be located in a different geographical area.

The video processing system 2100 may include a plurality of creative hubs 2104 for creative functions within the video processing system 2100. For example, it may be desired to have a plurality of creative hubs 2104, each in different geographical areas.

The video processing system 2100 may include a plurality of QC hubs 2106 for quality control functions within the video processing system 2100. For example, it is possible to have a plurality of QC hubs 2106, each in different geographical areas.

The video processing system 2100 may include a plurality of distribution hubs 2108 for distributing video content within the video processing system 2100. A given distribution hub 2108 may conveniently be located in a geographical area in which video material will be distributed.

It may also be desirable to have multiple different hubs of the same type (for example multiple creative hubs 2104) for different clients, to maintain confidentiality.

Embodiments will now be described in which the video processing system 2100 is used for a digital product placement project, wherein one or more advertising components are added to video material to produce integrated video material and advertising component to which the one or more advertising components have been added.

In these embodiments, one or more products are digitally placed into a program, such as a television program, intended for broadcast to an audience. The one or more products may serve as advertising components and/or may be used to enhance existing video material for the program, for example to add a special effect.

There are various different types of digital product placement, for example:
  product placement—a branded product or object can be placed into existing video material as if it were there when the video was originally recorded, as would be the case with true product placement; for example, a box of cereal on a kitchen table;
  indoor and outdoor signage—posters, hoardings and billboards, which typically appear in outdoor and indoor scenes and public areas, can be altered to appear to display a chosen product or brand; and
  video placement—video data can be embedded into existing video material, for example a commercial or animated sequence running on a TV screen which is in the background of a scene; it is also possible to insert screens on which the video placement may be played, should one not be available in the scene already.

It will be appreciated, however, that the video material need not be a program and could correspond to a feature length film, a promotional video, broadcast media, online media or video-on-demand services or other video material to which it is desired to add the one or more advertising components.

Figure 22:
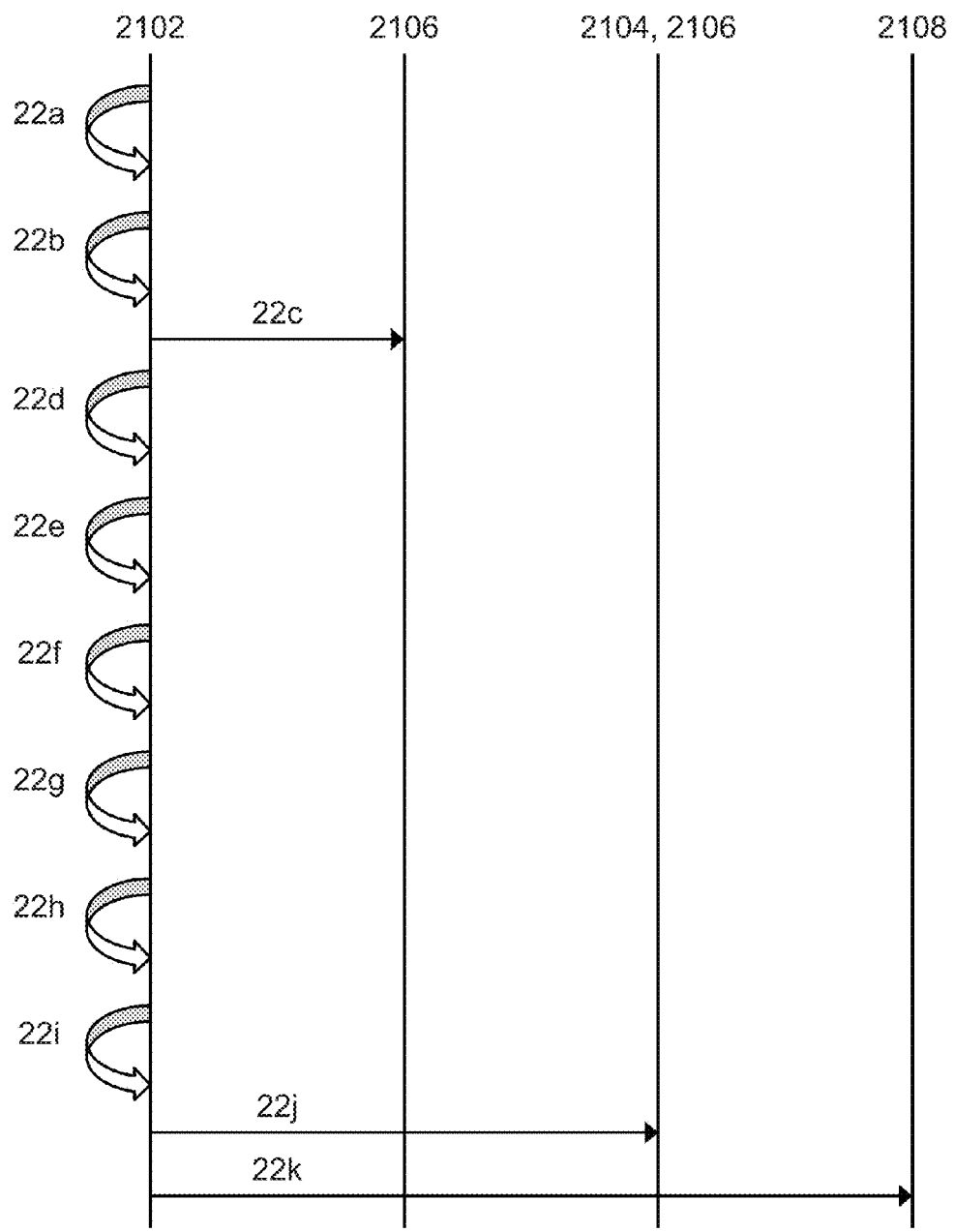
FIG. 22 is a sequence timing diagram showing the flow of messages associated with adding one or more advertising components into video material to produce integrated video material and advertising component in accordance with some embodiments.

FIG. 22 is a sequence timing diagram showing the flow of messages associated with adding one or more advertising components into video material to produce integrated video material and advertising component in accordance with some embodiments.

At step 22*a*, the source hub 2102 retrieves video material. The video material may be, for example, media program material into which it is desired embed one or more advertising components, such as one or more virtual products. The video material for the program contains various different shots. The shots are delineated by cuts, where the camera has stopped recording or where the video material is edited to give such an impression. Video material retrieval may be performed automatically or manually.

At step 22*b*, the source hub 2102 creates a relatively low resolution version of the video material, referred to herein as a "source proxy".

At step 22*c*, the source hub 2102 synchronizes the source proxy to one or more hubs, such as the creative hub 2104 and the QC hub 2106. The creative hub 2104 and the QC hub 2106 can use the source proxy to create in-context creative sequences and quality control sequences during the subsequent stages of video processing.

At step 22*d*, the source hub 2102 analyses the video material. This may involve conducting a pre-analysis pass in relation to the video material, for example to identify segments corresponding to separate shots in the video material. In some embodiments, the step of analyzing the video material occurs concurrently with or prior to creating the source proxy. Analyzing the video material may be performed automatically.

At step 22*e*, the source hub 2102 groups one or more of the identified segments with placement zones together, for example on the basis that they all relate to the same scene. The grouping of identified segments is performed automatically during the pre-analysis stage or manually.

At step 22f, the source hub 2102 selects one or more of the identified segments with placement zones for the inclusion of one or more advertising components. The one or more segments are selected from one or more groupings made in step 22e. The segments may be selected on the basis that they correspond to video material in which it is likely that products could be digitally placed. This step may be performed automatically during the pre-analysis stage or manually.

At step 22g, the source hub 2102 creates an embed project; a project for adding one or more advertising components to the video material to one or more identified segments in step 22f. This may involve creating an embed project file which contains data relating to the embed project. The source hub 2102 may create multiple embed projects for the video material. For example, where each embed project relates to a different locale and there are multiple different locales in the video material. The creation of the embed project may performed automatically, but with a manual trigger. All automatic processes that are triggered manually may be triggered from a user on any of the hubs with appropriate credentials.

Typically, not all of the identified segments of the video material are, in fact, suitable for product placement. Thus, not all of the identified segments are selected for digital product placement.

Segment selection may be performed automatically and/or manually. A human operator may be able to assess the appropriateness of opportunities for product placement in context. For example, a jar of instant coffee would suit a kitchen scene, but would look out of place in a bathroom scene, or in an outdoor desert scene—a human operator might therefore not select certain segments that may appear to provide a good opportunity for product placement on the basis that they would not be suitable in context. In another example, it may be decided that a kitchen worktop in a scene provides a good opportunity for a grocery product placement. It may be desirable to determine how long the kitchen worktop is in view—this may be performed manually or automatically. For example, if it is only a fleeting shot, the product placement opportunity is likely to be of limited interest. On the other hand, if the scene in the kitchen is long, and the location chosen for product placement is in view for this duration, it is likely that this scene will be or more interest for a product placement opportunity.

It may also be desirable to determine how many times a particular scene is featured in a program. One element of product placement is temporal consistency, also known as continuity. This involves having the same product in the same position every time that scene occurs in the program.

At step 22h, the source hub 2102 combines or concatenates video material associated with the placement zones into one composite video file, one for each embed project. The composite or combined video file is referred to herein as an "embed sequence" or "intermediate working version" of the video material. The creation of the embed sequence may be performed automatically.

The source hub 2102 creates an embed sequence from the selected shots with placement zones, joining them one after the other into one composite video file. The video material may have been dispersed throughout the video material so that adjacent video material in the composite scene was not necessarily adjacent in the video material.

In some embodiments, the embed sequence contains a reduced amount of video material compared to the video material. For example, the embed sequence may contain video material associated with a subset of the identified segments with placement zones of the video material—corresponding to the selected segment(s).

In some embodiments, the embed sequence does not include an audio track component. Some embodiments comprise removing an audio track component from the video material (if present).

It may be desirable, at this or another stage, to create one or more mock-ups of the desired look of the embed sequence. Such mock-ups may be created using the digital product placement assessment module 2102c.

In some embodiments, creating the mock-up(s) comprises rendering preview imagery which has a blue box or cylinder in the imagery to represent the (as yet unspecified) product to be placed for an interested party to allow the interested party to assess the product placement opportunity in detail. The preview imagery may be at a lower than final resolution, for example to reduce the amount of data to be transmitted if the preview imagery is being communicated over the data communications network 2110 and/or so as not to transmit a final resolution version of the preview imagery outside of the source hub 2102.

The source hub 2102 may insert a 'brand image container' into the preview imagery to assist the assessment by the interested party. For example, CGI-generated street furniture such as an advertising hording or bus shelter could be inserted into the mock-up(s), so that a virtual poster displaying a message from the interested party can be placed on this street furniture. In another example, a CGI-generated television could be inserted into, for example, a living room scene, so that virtual videos could be played on the television set. To promote products, the virtual video could be an advertisement for a product or could merely feature the product in question.

The source hub 2102 may also create a report comprising one or more metrics associated with the potential product placement opportunity, for example specifying how much total time and over how many scenes the potential product can be seen. Much popular television is episodic, which means that same scenes, locales, and characters may reappear in each episode or show in a series. Thus, product placement opportunities may relate to more than one episode of a program, for example for a space on the kitchen table in the house of a famous character over many episodes, or even over multiple series.

Information regarding the characters can be added to the metrics, including their name/gender/marital status/parental status/age/socio-economic group. Video material can be searched based on these parameters.

There are many ways in which the product placement opportunity can be brought to the attention of the interested party. In some embodiments, the source hub 2102 uploads the low resolution mock up material, optionally with the report on the opportunity, to the online portal 2116 to facilitate access by the interested party. This allows the opportunity to be presented to a large audience and, using the scalability of cloud-based application servers, can be used to present the opportunity to a number of interested parties in an online marketplace environment. As such, potential advertisers and/or brokers for such advertisers may be able to access continually updated information on current product placement opportunities.

At step 22i, the source hub 2102 creates metadata comprising information concerning the embed project.

In some embodiments, the source hub 2102 and adds the metadata to the embed sequence video data file and/or in the project file created by the source hub 2102 at step 22g and/or in a separate file to the embed sequence. The metadata may be created in XML (eXtensible Markup Language) or another format. The creation of the metadata may be performed automatically. The metadata may identify, using one or more data elements for each data type, one or more of the following:

- the source hub 2102, QC hub 2106 and distribution hub 2108 to be used for this embed project—this information is used to identify the particular hubs involved in this particular embed project where there are multiple source hubs 2102, QC hubs 2106 and/or distribution hubs 2108 in the video processing system 2100;
- a brand and/or brand agency involved;
- the content owner of the media;
- the media family (for example the name of a series of which the video material corresponds to an episode);
- the particular episode and season associated with the video material (where appropriate);
- the scene within the episode to which the embed sequence relates—this may be identified using a UUID (Universally Unique IDentifier);
- the frames covered by the embed project—this data supports the reconform process, which will be described in more detail below;
- the timecodes in the video material corresponding to frames in the embed sequence—this data also supports the reconform process;
- the format of the embed sequence, such as whether it is: progressive video;
  - interlaced video, upper/lower field dominant;
  - 3:2 pulldown video with specific field dominance and cadence, which may or may not be the same for each shot;
  - advanced pulldown with specific field dominance and cadence, which may or may not be the same for each shot; and
- the codec to be used to compress the video when rendering the project—this may be changed subsequently.

At step 22j, the source hub 2102 initiates synchronization with the creative hub 2104, where the embed project is to be worked on.

In some embodiments, the source hub 2102 automatically uploads the embed sequence and/or other project-related data such as project metadata to the creative hub 2104, QC hub 2106 and/or distribution hub 2108 as part of the synchronization. The source hub 2102 may also transmit a message to the relevant hub(s) indicating that the new embed project has been created.

By uploading the embed sequence (rather than the entire video material), the amount of data to be transferred between the source hub 2102 and the creative hub 2104 may be significantly reduced where the embed sequence contains less video data than the video material. Since these data transfers may be via limited bandwidth connections, transfer costs and transfer time may also be improved.

The source hub 2102 may also pre-emptively upload the embed sequence to the QC hub 2106 at this stage, even though the QC work at the QC hub 2106 may not be undertaken for some time. Pre-emptively transmitting the embed sequence to the QC hub 2106 may reduce processing times when the QC work does eventually start since it can have already received at least some of the embed sequence by the time the QC work starts. In some cases, the QC hub 2106 may have received all of the embed sequence by the time the QC work starts at the QC hub 2106.

At step 2k, the source hub 2102 transmits the video material to the distribution hub 2108 so that the distribution hub 2108 has a copy of the video material into which the one or more advertising components are to be added.

Figure 23:
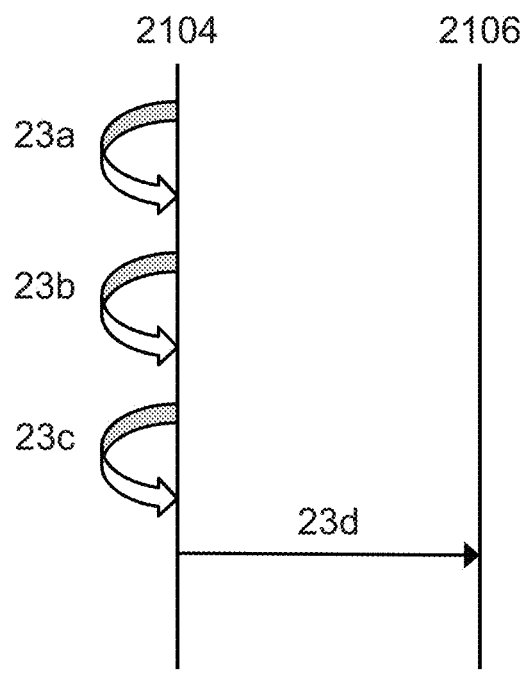
FIG. 23 is a sequence timing diagram showing the flow of messages associated with adding one or more advertising components into video material to produce integrated video material and advertising component in accordance with some embodiments.

FIG. 23 is a sequence timing diagram showing the flow of messages associated with adding one or more advertising components into video material to produce integrated video material and advertising component in accordance with some embodiments. The transmission of the video material may be performed automatically, but with a manual trigger.

In these embodiments, the video material is the embed sequence transmitted from the source hub 2102 to the creative hub 2104 at step 22j as part of the synchronization process. In some embodiments, the embed sequence includes only video material corresponding to segments in which the opportunity to embed a product has been agreed. In other words, in such embodiments, segments in which no product is to be added are not communicated to the creative hub 2104.

At step 23a, the creative hub 2104 sources or prepares additional media data such as high quality artwork to represent the product (referred to herein as "embed artwork"). The embed artwork may comprise artwork images and/or videos and/or other forms of graphics to be used in the embedding process. The embed artwork may include, for example, a high resolution product label, or a suitable photograph of the product or the like. The embed artwork may be prepared at the creative hub 2104, received from the source hub 2102, from the online portal 2116 or otherwise.

There are many ways of building virtual products to which the embed artwork can be applied. For example, virtual products may be built using 3D computer graphics systems such as 3DS Max or Maya, both from Autodesk in Canada. Virtual product building may include the creation of Computer Graphic 3D 'boxes' that may then be wallpapered with product artwork to form a virtual product, or design of a virtual bottle in CGI and then the CGI affixing of label artwork. Sourcing or preparing the additional media data may be performed automatically.

At step 23b, the project is then worked on at the creative hub 2104. The creative stage may involve significant human intervention, although at least some of the creative steps may be performed at least in part automatically. For example, when used, the creative software automatically separates its timeline into the various shots in the embed sequence upon reading the embed sequence to facilitate working on each shot in succession.

Various creative tasks that may be performed at the creative hub 2104 at this stage will now be described. These tasks may be used to identify one or more desired visual attributes for the digitally placed products to possess when incorporated into the embed sequence. Such visual attributes include, but are not limited to being, position attributes, masking attributes, visual appearance attributes (for example relating to blur, grain, highlights, 3D lighting effects).

The creative hub 2104 may track motion for the virtual product in the embed sequence and produce corresponding tracking instructions that define the desired motion attributes of the product.

Tracking involves tracking the position of the virtual product, as it will appear in the embedded sequence. In all likelihood, the camera that shot the video material would have moved, either in a tracking shot, or a zoom, such that the position of the virtual product in the corresponding video material would not be in a constant horizontal and vertical position as referred to in the picture or in 3D space. Tracking is used to determine the horizontal and vertical position of the virtual product on each frame of the embed sequence in which the product is to be placed. In general, the tracking information may include 2D and 3D perspective effects such as scale, rotation and shear.

The creative hub 2104 may create masks for any foreground objects in the embed sequence that obscure all or part of the embedding area, i.e. the area in which the virtual product is to be embedded, and produce corresponding masking instructions that define the desired masking attributes in relation to product.

In some embodiments, this process comprises using automatic and semi-automatic techniques such as rotoscoping and keying, in which a combination of user adjustable settings and algorithms may be used to separate the foreground and the background in the embed sequence. Rotoscoping involves, in effect, hand-drawing the outline of occluding objects in front of the virtual product, such as actors and furniture, over the live action. Keying involves using a key signal to determine which of two images is to be chosen for that part of the final image.

The creative hub 2104 may perform appearance modeling, relating to positioning and adjusting the appearance of the embed artwork, and produce corresponding appearance modeling instructions that define the desired visual appearance of the product.

For example, it may be desirable to integrate the virtual product into the embed sequence so that it looks like it might have been present when the corresponding video was originally shot. Appearance modeling may therefore be used to be to make the virtual product look real. It may involve perspective alteration of the object to be placed, to make it look natural in the scene. It may additionally or alternatively involve adding 3D lighting, for example where a directional light is near the virtual object a viewer would expect the virtual object to cast shadows from the light. 3D lighting can be added in a number of industry standard 3D packages such as 3DS-Max or Maya from Autodesk Inc, in Canada.

In some cases, it may be desirable to apply one or more further image processing features to the CGI object that is to be placed in the scene, so that the object matches the look created by the camera, lighting and post production process.

Alternatively, an entirely animated and/or artificial appearance may be desired.

One option for rendering the final material—a final version of the source video material which includes any embedded products—would be to render it at the creative hub 2104. This would involve rendering the embed sequence at the creative hub 2104, combining it in with the video material at the creative hub 2104 to form a complete program with embedding in, and then transferring the complete embedded material to the distribution hub 2108, possibly via the QC hub 2106. However, all of the video material would need to be available at the creative hub 2104 in order to do so. As explained above, in some embodiments, only the embed sequence, rather than the complete video material, is transmitted to the creative hub 2104.

Various embodiments which will now be described in which the final material to be broadcast is not finally rendered at the creative 2104. These embodiments relate to a technique referred to herein as "push render" where the creative hub 2104 transmits instructions to another hub to render the project. The rendered material can then be combined in with the relevant video data at another hub.

Transmitting the instructions, rather than the rendered material, can result in a significant reduction in the amount of data being transmitted between the different hubs. Notwithstanding this, it may be desirable, in some circumstances, to transmit rendered material in addition to, or as an alternative to, push rendering instructions—push rendering does not necessarily preclude transmitting rendered material, but provides an additional option for reducing data transfers when used.

Embed projects may be managed using a suitable project management system. The project management system can include management of project initiation, creation of the embed artwork, tracking, masking and appearance modeling, approvals and other functions. The project management system may also support various different push render phases indicating whether the embed project push render is:

a local render, in which an embed project output video (produced by rendering the instructions in a push render) is rendered locally on a hub but has no additional workflow links such as online video creation or project management notifications;

a blue box render in which the project has blue boxes placed in the video material to identify the areas where the actual products would or could be digitally placed;

a QC render to check for the quality of the tracking, masking, appearance modeling and other work carried out at the creative hub 2104;

a final QC render to check the appearance of the final embed before delivering the completed project to the client(s); and a delivery render, in which the rendered video is sent to the client to view online so the client can check the complete placement with audio—when approved, the final media can be delivered back to the client.

At step 23c, the creative hub 2104 may: a) create a project file which contains all of the tracking, masking, appearance modeling instructions and any other data created at the creative hub 2104, as well as, optionally, the embed project metadata or a subset thereof; or b) update an existing project file received from the source hub 2102 with such data. Creating or updating the project file may be performed automatically, but with a manual trigger.

In some embodiments, the creative hub 2104 receives the metadata created at the source hub 2102 in the embed sequence video file or in a separate file. The creative hub 2104 may include some or all of the metadata in the project file to support the push render workflow. For example, where the metadata identified the distribution hub 2108 to be used in this project, the project file may comprise data identifying the distribution hub 2108. In addition, where the metadata identified one or more frames in the video material that corresponded to the embed sequence; the project file may include such data to facilitate reconforming.

At step 3d, the creative hub 2104 then transmits or pushes video file data comprising at least the rendering instructions to the QC hub 2106 for QC purposes.

The video file data sent to the QC hub 2106 to initiate push rendering of the project at the QC hub 2106 for QC purposes may be a package (for example a zip package) comprising: (1) a project file defining the tracking, masking, appearance modeling, embed artwork, and other data (such as effects data); (2) the embed artwork; and (3) some or all of the embed project metadata.

Alternatively, video file data could comprise only items (1) and (3). The embed artwork could be synced to the QC hub 2106 automatically as soon as it is created on the file system. For example, the creative hub 2104 could transmit the embed artwork to the source hub 2102 and doing so could trigger uploading of the embed artwork to the QC hub 2106 associated with the project. This may reduce further the amount of data to be sent to the QC hub 2106 when the push render is initiated in that the QC hub 2106 may receive at least some of the embed artwork prior to starting the QC work. Transmitting the video file data to the QC hub may be performed automatically, but with a manual trigger.

Figure 24:
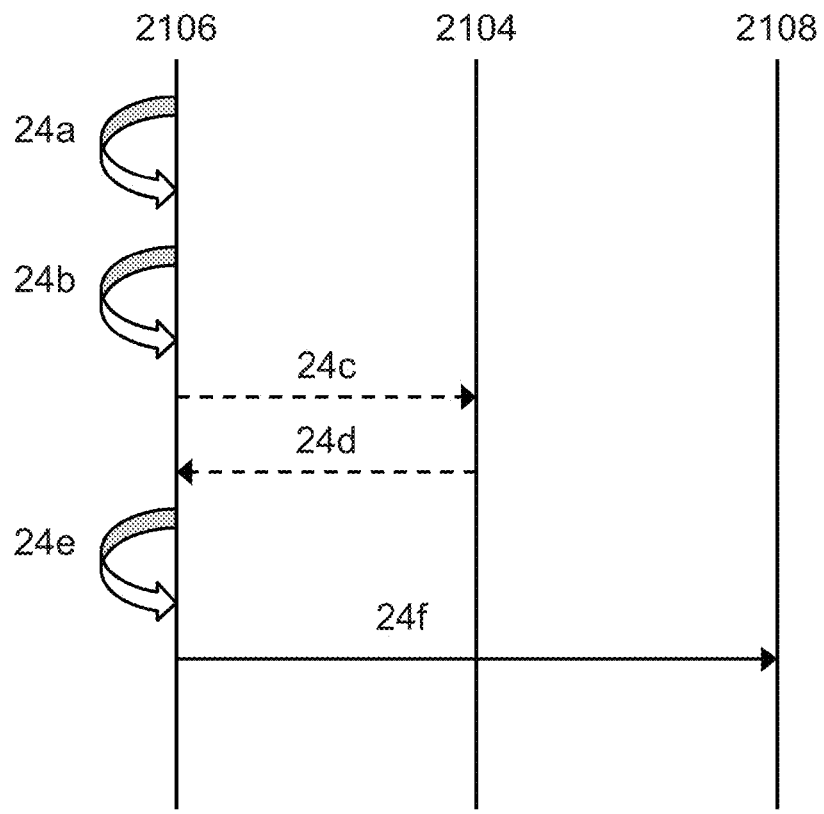
FIG. 24 is a sequence timing diagram showing the flow of messages associated with adding one or more advertising components into video material to produce integrated video material and advertising component in accordance with some embodiments.

FIG. 24 is a sequence timing diagram showing the flow of messages associated with adding one or more advertising components into video material to produce integrated video material and advertising component in accordance with some embodiments. The QC hub 2106 has received the video file data transmitted from the creative hub 2104 at step 3*d*.

At step 24*a*, the QC hub 2106 renders the project based on the received rendering instructions. Rendering produces integrated video material and advertising component that contains the rendered embed artwork. Each frame of the integrated video material and advertising component contains the rendered embed artwork in the correct place and with the correct look as produced at the creative hub 2104 and as defined in the project file. Rendering the project based on the received rendering instructions may be performed automatically.

In some embodiments, the rendering technique used is precomposite rendering, wherein only the embed artwork is rendered, with a separate alpha channel, so that it can be later composited onto (i.e. blended with) the video material. This technique allows there to be only one stage of reading and writing original media frames; the final stage of reconform which will be described in more detail below. This reduces generation loss caused by decoding and re-encoding the video data. It also allows the rendered embed project video to be small.

In more detail, for a computer-generated 2D image element which stores a color for each pixel, additional data is stored in a separate alpha channel with a value between 0 and 1. A stored value of 0 indicates that no objects in the 2D image overlapped the associated pixel and therefore that the pixel would effectively be transparent if the 2D image were blended with another image. On the other hand, a value of 1 indicates that an object in the 2D image overlapped the pixel and therefore that the pixel would be opaque if the 2D image were blended with another image.

Thus in some embodiments, rendering results in, in effect, integrated video material and advertising component in the form of overlay video data in which the virtual products are rendered and any embed artwork is applied to them. The overlay video data may be viewed as part of the QC process to check the quality of the creative work performed at the creative hub 2104.

Various steps may or may not be performed at the QC hub 2106 depending on the push render options used and which push rendering phase has been reached.

The QC hub 2106 may compute metrics of the embedded sequence, for example by measuring the area and location of the embed(s) (embedded object(s)) in each frame. These metrics may be combined with integration metrics (human judgments as to how well the embed interacts with the scene in which it is placed) into a report which can be delivered to an interested party. For instance, the embed may be in the background or the foreground, and there may or may not be actual or implied interaction between the embed and (key) actors. In embodiments, the report is published online via the online portal 2116 and made available to designated parties.

In some embodiments, the overlay video data may be combined (i.e. blended) with video data derived from the video material, such as the embed sequence or a proxy version of the video material.

Push rendering an embed project file may create some or all of the following output files, using appropriate identifiers to identify the content provider, media family, episode etc.

The QC hub 2106 may produce a composite of the rendered embed artwork and the embed sequence for viewing for QC purposes. In other words, the QC hub 2106 may create a sequence comprising the embed sequence with the embed artwork applied. This sequence can be used to judge the quality of the embedded artwork, in each shot in isolation.

The QC hub 2106 may create a sequence comprising a contiguous section of the video material (extracted from the source proxy), with the shots from the embed sequence showing the embedded artwork that was added to those shots. Any audio in the video material that had been removed could be added back into the scene previews at this stage. This version is used to judge the quality of embedded artwork in the context of the surrounding video and the audio.

In terms of the rendering process, the QC hub 2106 may create a video data file, for example a ".mov" file, in an appropriate directory. This is the output precomposite (RGB plus alpha channel) video containing the rendered virtual product with embed artwork applied thereto. The frame numbers for this video data file correspond to those of the embed sequence.

The QC hub 2106 may create a file (such as an XML file) which comprises per-frame metrics and a digital image file metrics (such as a .jpg file) which is a representative metrics image of the embedded sequence with a blue border.

The QC hub 2106 may also create a file that specifies the relevant push render phase (in this case, the QC phase). This is a copy of the project file or other video file data (such as the zip package) that was rendered.

The QC hub 2106 may also create one or more branded previews (for example in MP4 format) that may be sent to the online portal 2116 for preview by the client(s).

The QC hub 2106 may also create a video data file, such as a ".mov" file, for the output composite (RGB) video containing the virtual product(s) rendered into the embed sequence. This process may involve digital compositing in which multiple digital images are combined to make a final image; the images being combined being frames in the precomposite video and corresponding frames in the embed sequence. This may comprise alpha blending, where the contribution of a given pixel in the precomposite video to a corresponding pixel in the composited video is based on the opacity value stored in the alpha channel in association with the pixel. Where the opacity value of a foreground pixel is 0 (i.e. where the stored value associated with that value is 0), the corresponding pixel is completely transparent in the foreground; where the opacity value of a foreground pixel is 1, (i.e. where the stored value associated with that value is 1), the corresponding pixel is completely opaque in the foreground.

At step 24*b*, an operator uses the visual QC module 2106*b* at the QC hub 2106 to perform a visual QC check on the sequences that have been processed at the QC hub 2106. This may involve trained operators viewing the rendered material and looking for errors. If visual faults are detected, they can be communicated back to the creative hub 2104, where they can be corrected (steps 24*c* and 24*d*). The cycles of correction may be recorded in the project file. The QC check is principally performed manually, although some aspects may be automated.

At step 24*f*, when the material has finally passed quality control (step 24*e*), the QC hub 2106 transmits video file data to the distribution hub 2108. The video file data may comprise a push render (which enables the distribution hub 2108 to generate associated video material, rather than transmitting the video material itself), or video material that has already been rendered or otherwise produced.

Similar to the video file data transmitted to the QC hub 2106 by the creative hub 2104 at step 3*d* to initiate push rendering at the QC hub 2106, the video file data sent to the distribution hub 2108 at step 24*f* may be a zip package comprising items (1) to (3) specified above or may be a single file containing items (1) and (3) of the zip package. The embed artwork could likewise have been synced to the distribution hub 2108 automatically as soon as it was created on the file system to reduce further the amount of data to be sent to the distribution hub 2108 when the push render is initiated.

Figure 25:
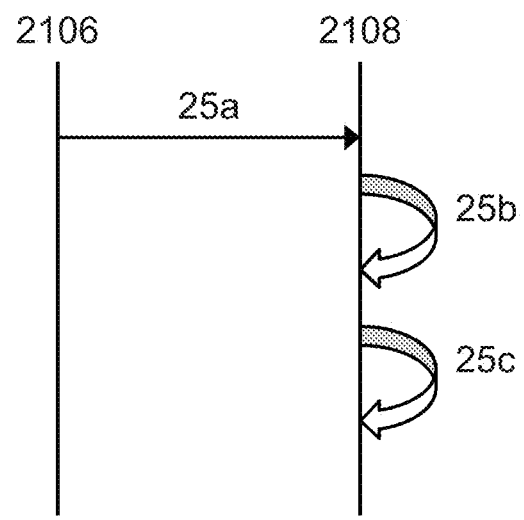
FIG. 25 is a sequence timing diagram showing the flow of messages associated with adding one or more advertising components into video material to produce integrated video material and advertising component in accordance with some embodiments.

It will be appreciated that the video file data transmitted to the distribution hub at step 24f may different data to that in the video file data transmitted by the creative hub 2104 at step 3d. For example, as part of the QC process, the creative hub 2104 may have updated at least some of the data in the video file data and communicated at least some of the updated data to the QC hub 2106 at step 24d. The QC hub 2106 could then transmit video file data including the updated data to the distribution hub 2108 at step 24f. Alternatively or additionally, the QC hub 2106 may update some or all of the data in the video file data transmitted by the creative hub 2104 at step 24d itself and include the updated data in the video file data transmitted to the distribution hub 2108 at step 24f. The transmission of the video file data to the distribution hub 108 may be performed automatically, but with a manual input. FIG. 25 is a sequence timing diagram showing the flow of messages associated with adding one or more advertising components into video material to produce integrated video material and advertising component in accordance with some embodiments.

At step 25a, the distribution hub 2108 receives the video file data from the QC hub 2106.

In some embodiments, the distribution hub 2108 has also already received the video material, or data derived therefrom, transmitted by the source hub at step 2k.

At step 25b, the distribution hub 2108 obtains video material comprising the one or more advertising components based on the video file data. This may involve rendering the video material if the video file data comprises instructions for generating the video material. Rendering may be similar to or the same as the rendering carried out at the QC hub 2106 and the distribution hub 2108 may create at least some of the same data files as those created at the QC hub 2108 during the QC push render phase, albeit at a final QC render and/or delivery render phase.

Alternatively, the video file data may already contain the video material, in which case the distribution hub 2108 may extract the video material from the video file data. Rendering may be performed automatically.

At step 25c, the distribution hub 2108 combines the rendered video material (which includes the embedded object(s)) with the video material to form a completed program, or integrated video material and advertising component, which contains the digitally placed product(s). Reconform is performed automatically and may be initiated from within an appropriate software application or by an online user with appropriate credentials. The integrated video material and advertising component is then suitable for broadcasting or other dissemination, such as the sale of DVDs, or downloading programs via the Internet.

In more detail, reconform takes the result of push rendering one or more embed project files as described above. The precomposite (overlay) video data produced by the push render is blended with or composited onto the video material, using the metadata associated with the embed project to place the rendered product(s) in the correct frames in the video material. Within the frame range, each frame is read from video material, and any precomposite outputs for that frame provided by the push rendered projects are overlaid on the video material, in an internal memory buffer. Finally the frame is exported. To determine which embed to overlay, the reconform software looks at the metadata for the push render project. The relevant data is that which specifies, for each shot from the embed project, the start frame of the shot in the timeline of the embed sequence, the start frame of the shot in the timeline of the video material, and the number of frames in the shot. From this information, each frame may be mapped between the video material and the precomposite video. The relevant frames in the video material may, however, be identified in the metadata in another manner.

In some embodiments, reconform may be performed by a cluster of servers or other suitable computing devices. The reconform then commences on the cluster.

A new version of the video material is thereby created which includes the modified frames to produce the final video material or integrated video material and advertising component.

In the embodiments described above, the amount of user interaction involved in push rendering a project is minimal. One or more operators specify which embed project file to render, and the phase of the push render workflow (for example, the QC stage or the final delivery stage). All details of the render itself are, in effect, automatically performed based on rendering instructions in the project file or other push render data.

In some embodiments, other parts of the metadata associated with the project are used in the process of rendering the project. For example, online videos may be created and automatically assigned permissions that allow only the correct client(s), whose details are included in the metadata, to view them.

In some embodiments, the project file comprises data specifying one or more locations on the file system to which the project is to be rendered. In such embodiments, the workflow may be simplified because the push render is simultaneously a rendering solution and a distribution solution. This allows the process of supporting the workflow to be achieved in one step.

In some cases, there may be information that will be part of the report on the project, but which is sensitive to the client and which it would therefore be preferred not to send to the creative hub 2104 or the QC hub 2106. By rendering the project at the source hub 2102 or distribution hub 2108, such secret information need not be sent to the creative hub 2104 or the QC hub 2106. Nevertheless, if it is desired to render at the creative hub 2104 or the QC hub 2106, the secret information could be automatically omitted from any report created by the render, or the report itself omitted.

Some embodiments provide a feedback mechanism in relation to the push render workflow, because the project may be pushed from the creative hub 2104 or QC hub 2106 to another hub, such as the source hub 2102 or the distribution hub 2108, which may be on the other side of the world. Such embodiments provide feedback on the progress and success or failure of the rendering by feeding back the status of the render to software running at the creative hub 2104 and/or QC hub 2106.

In some embodiments, a project may be push rendered to a hub other than the one specified as the QC hub 2106 or distribution hub 2108. For example, it may be desired to render an embed project generated by the creative hub 2104 at a hub other than hubs 2102, 2106, 2106, 2108. The other hub may have a proxy version (low resolution and compressed) of relevant parts of the video material. From this, it would be possible to render an embed project through local push rendering. This could be used as part of a QC process, viewing the result of the rendering to ensure that the project has been completed satisfactorily.

As explained above, the video processing system 2100 may comprise a plurality of different source hubs 2102, creative hubs 2104, QC hubs 2106 and/or distribution hubs 2108.

Where a single piece of source material gives rise to different embed projects targeted at different countries, it may be desirable to transmit the video material in advance to respective distribution hubs 2108 in those countries and then render the projects at those distribution hubs 2108. An example may be an episode of a popular US episodic series shown in Europe. In Poland, it may be required to incorporate a Polish brand, but in Germany, in the same scenes, it may be required to position a German brand. In this example, the source hub 2102 transmits the video material to distribution hubs 2108 in Poland and Germany and transmits embed sequences to both the Polish and German creative hubs 2104. This may significantly reduce the time between obtaining client approval and final delivery at the correct system for broadcast or distribution.

Embodiments described above provide significant data transfer savings, in that the creative hub 2104 and/or the QC hub 2106 only transmits instructions on what to do to embed and then render the integrated video material and advertising component, rather than transmitting the rendered embed sequence itself with the embedded objects. Such embodiments do not preclude transfer of some, or all, of the rendered embed sequence, but it is preferably not transmitted in such embodiments.

Where the embed instructions are sent from the creative hub 2104 to the source hub 2102, QC hub 2106 or distribution hub 2108, these instructions may be interpreted locally by similar software as was used at the creative hub 2104.

Figure 26:
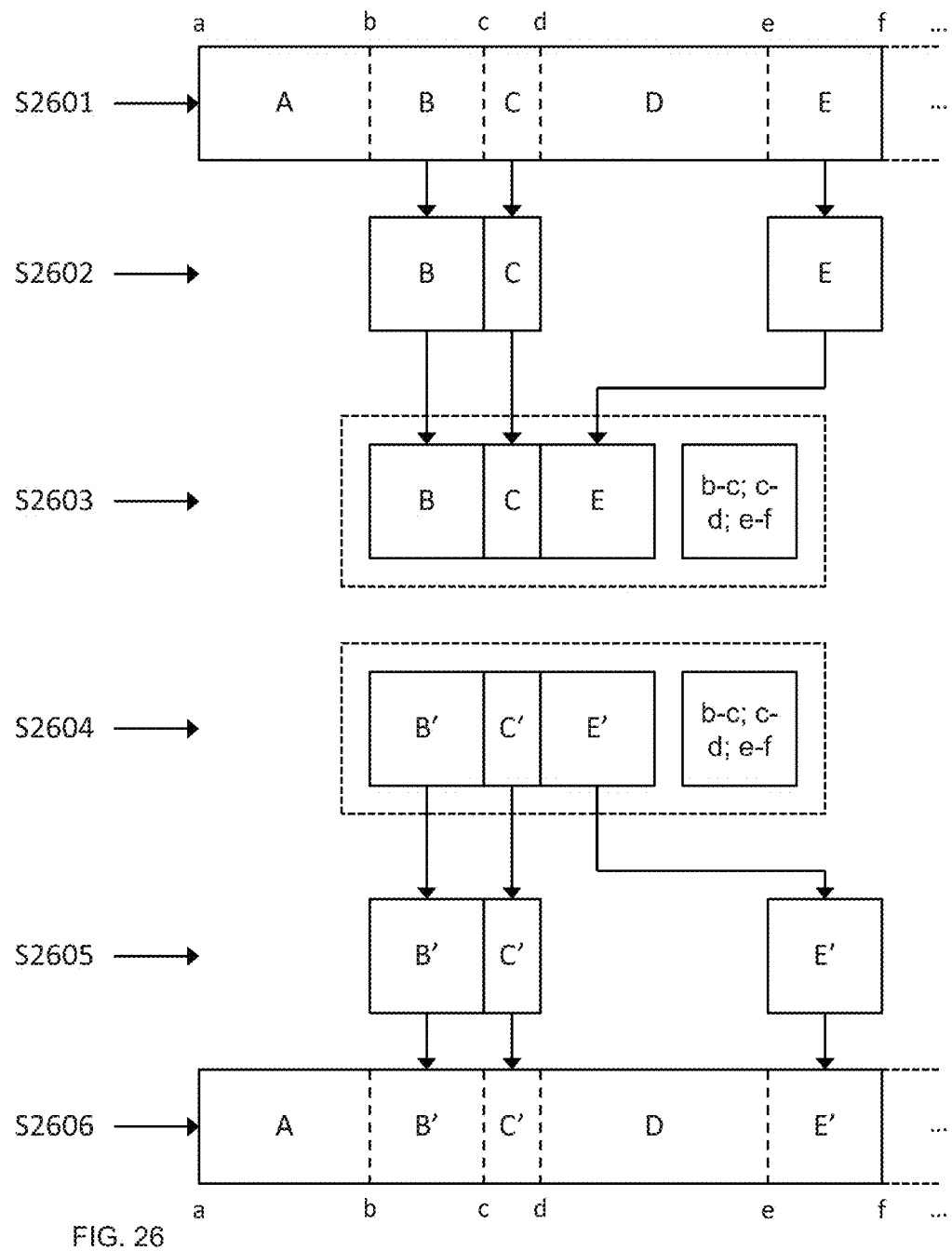
FIG. 26 is a diagram that illustrates schematically a method for incorporating one or more advertising components into video material to produce integrated video material and advertising component in accordance with some embodiments.

FIG. 26 is a diagram that illustrates schematically a method for incorporating one or more advertising components into video material to produce integrated video material and advertising component in accordance with some embodiments.

At step S2601, video material is retrieved. The video material is made up of a number of frames of image data. Segments (A, B, C, D, E, . . . ) of the video material identified. For example, each segment may correspond to a shot in the video material. Each segment comprises a number of frames of video material. For example, segment A comprises a number of frames of video material between frame identifiers "a" and "b", segment B comprises a number of frames of video material between frame identifiers "b" and "c" and so on. The frame references may be, for example, frame numbers or timecodes associated with the start and end frames of each segment.

At step S2602, one or more of the identified segments with placement zones within the video material are selected for the inclusion of one or more advertising components. For example, segments B, C and E may be selected for the inclusion of the one or more advertising components.

At step S2603 an intermediate working version of the video material is created. The intermediate working version includes at least video material corresponding to the selected segments (segments B, C and E). Metadata which identifies at least one frame within the video material which corresponds to the selected segments is created. The metadata identifies the frames in the video material to which segments B, C and E correspond by including the frame identifiers that correspond to the start and end of each segment: b-c; c-d; and e-f respectively.

At least the intermediate working version is transmitted to a remote system for the creation of integrated video material and advertising component for including the one or more advertising components in the integrated video material and advertising component. In some cases, the metadata may also be transmitted to the remote system.

At step S2604, the video file data associated with the integrated video material and advertising component is received after it has been created using the intermediate working version transmitted to the remote system. In some embodiments, the integrated video material and advertising component is the intermediate working version with the one or more advertising components added thereto. Segments B, C and E in the intermediate working version are denoted as segments B', C' and E' in the integrated video material and advertising component to indicate that the one or more advertising components have been added thereto. Metadata is retrieved which identifies at least one frame within the video material to which the integrated video material and advertising component is to be added. As depicted in FIG. 26, the retrieved metadata includes the frame identifiers that correspond to the start and end of each segment B', C' and E' in the integrated video material and advertising component: b-c; c-d; and e-f respectively.

At step S2605, the metadata can be used to determine the frames within the video material to which the integrated video material and advertising component is to be added.

At step S2606, at least the integrated video material and advertising component, the video material and the retrieved metadata are used to produce the integrated video material and advertising component. In particular, the integrated video material and advertising component includes the original segments A and D that did not form part of the intermediate working version. The segments B', C' and E' in the integrated video material and advertising component to which the one or more advertising components have been added into the video material and have replaced corresponding original segments B, C and E.

Figure 27:
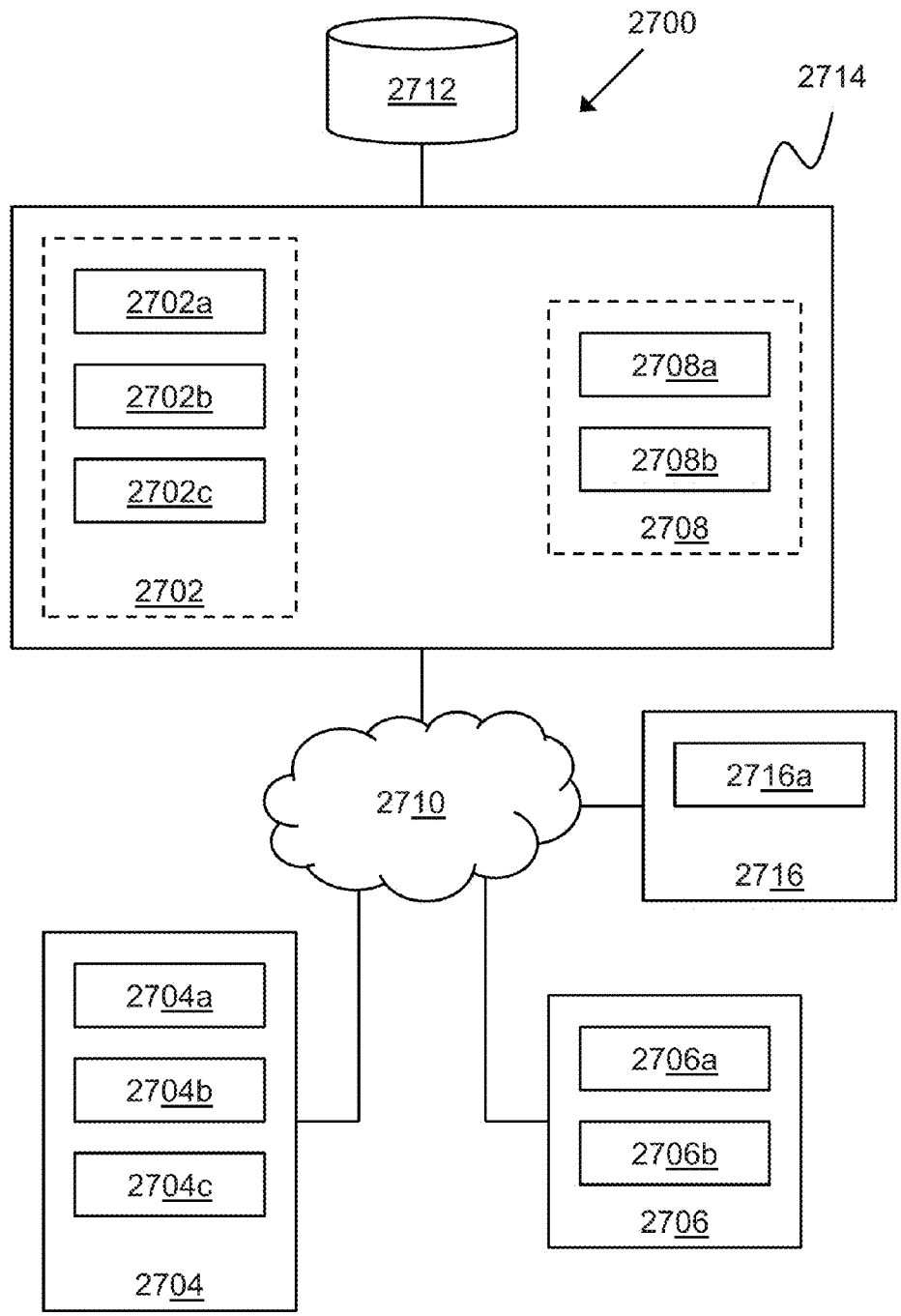
FIG. 27 is a schematic diagram showing a system in accordance with some embodiments.

FIG. 27 is a schematic diagram showing a video processing system 2700 in accordance with some embodiments.

The video processing system 2700 is similar to the video processing system 2100 described above in relation to, and as depicted in, FIG. 21. Like features are indicated using the same reference numerals, incremented by 600, and a detailed description of such features are omitted here.

In the video processing system 2700, the functionality of the source hub 2702 and the distribution hub 2708 are combined into a single entity 2714. Entity 2714 thus includes at least the video data analysis module 2702a, segment sorting module 2702b, digital product placement assessment module 2702c, rendering module 2708a and reconforming module 2708b.

Figure 28:
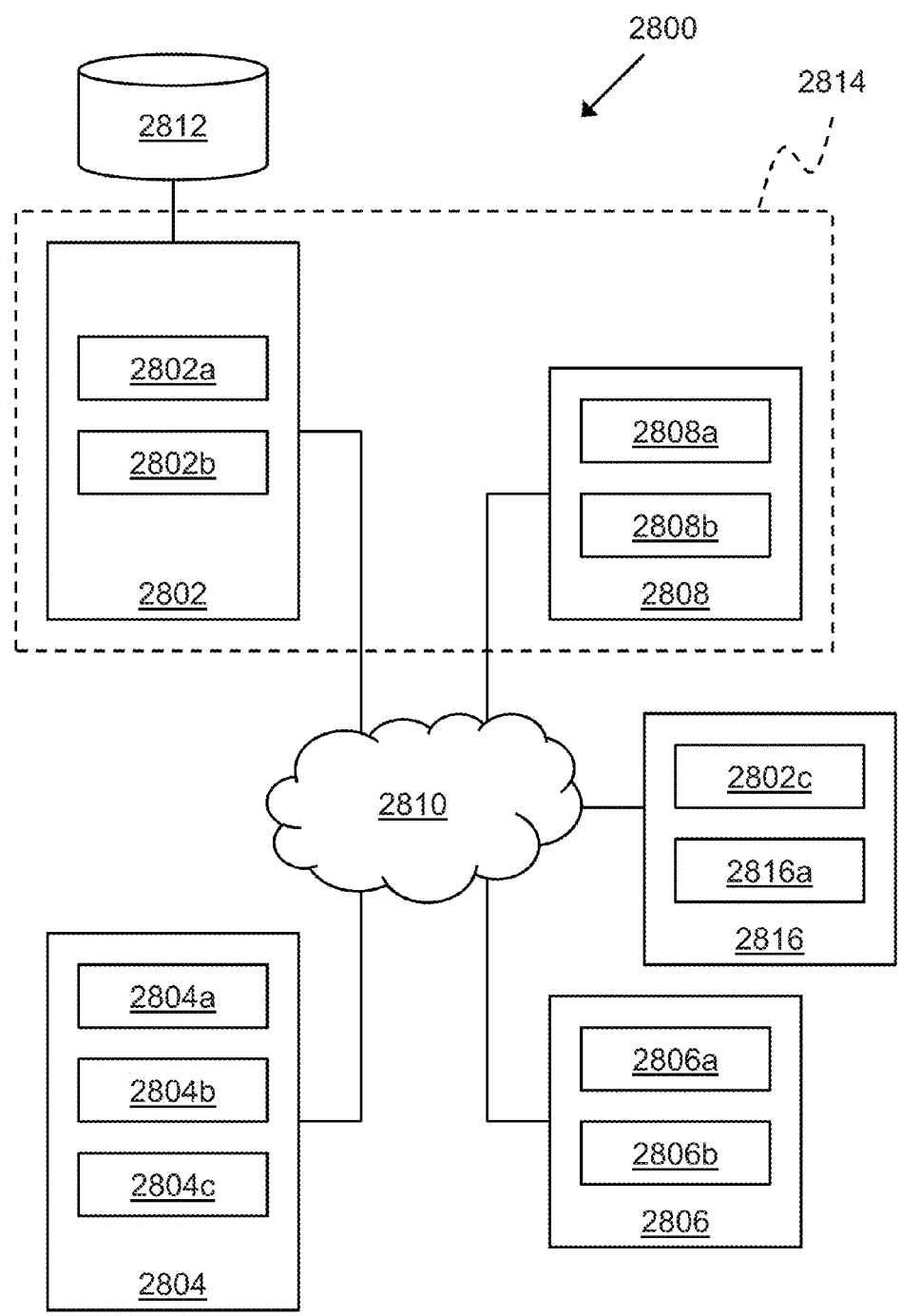
FIG. 28 is a schematic diagram showing a system in accordance with some embodiments.

FIG. 28 is a schematic diagram showing a video processing system 2800 in accordance with some embodiments.

The video processing system 2800 is similar to the video processing system 2100 described above in relation to, and as depicted in, FIG. 21. Like features are indicated using the same reference numerals, incremented by 700, and a detailed description of such features are omitted here.

In the video processing system 2800, the digital product placement assessment module 2102c of the source hub 2102 is moved into the online portal 2816; the online portal 2816 therefore includes a digital product placement assessment module 2802c which performs the same or similar functions as the digital product placement assessment module 2102c of the source hub 2102. In such embodiments, the embed sequence may be created and be placed in the cloud, for example at low resolution, which could be used to produce mock-ups of the product placement opportunity locally at customer premises.

Although, in the video processing system 2800 depicted in FIG. 28, only the digital product placement assessment module 2102c of the source hub 2102 is moved into the online portal 2816, embodiments are envisaged in which one or more of the video data analysis module 2102*a*, segment sorting module 2102*b*, and the digital product placement assessment module 2102*c* of the source hub 2102 are moved into the online portal 2816. For example, the segment sorting module 2102*b* could be placed into the online portal 2816, allowing characters and locales to be annotated at customer premises.

In some embodiments, all segments in the video material may be placed into the online portal 2816. This may not be as secure as uploading only some, selected segments. However, the form of the video material, after pre-analysis/segment sorting, may not be in the same linear timeline as the video material. This is because pre-analysis/segment sorting may group like scenes, camera angles and/or locales that may appear at different parts of the program together. Thus, even if a determined third party were to get hold of the video material, they would have to undo the pre-analysis/segment sorting, and edit the video material back together into its original form. This offers some form of security.

Figure 29:
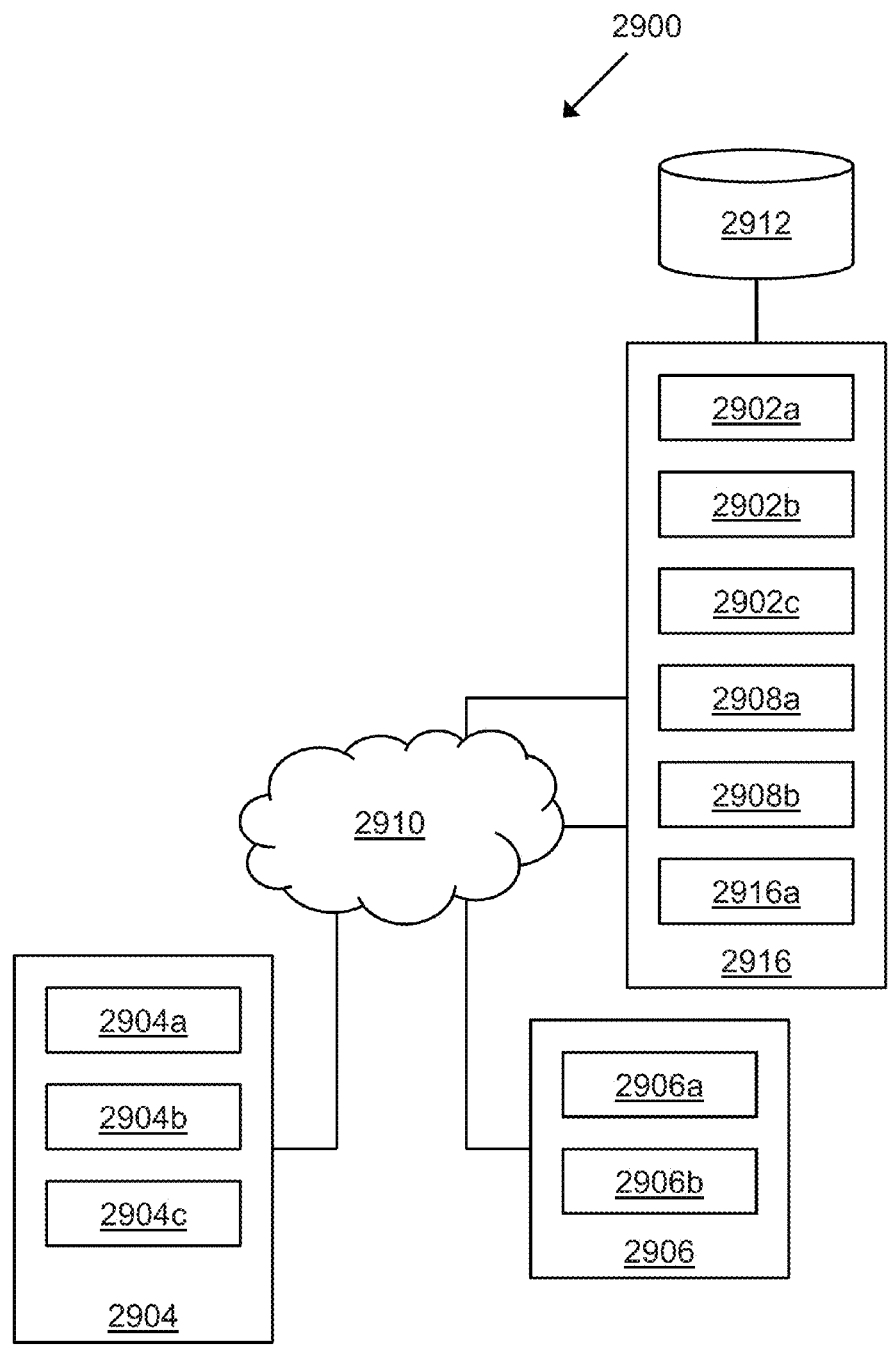
FIG. 29 is a schematic diagram showing a system in accordance with some embodiments.

FIG. 29 is a schematic diagram showing a video processing system 2900 in accordance with some embodiments.

The video processing system 2900 is similar to the video processing system 2100 described above in relation to, and as depicted in, FIG. 21. Like features are indicated using the same reference numerals, incremented by 800, and a detailed description of such features are omitted here.

In the video processing system 2900, all of the processing performed at or by the source hub 2102 and the distribution hub 2108 has been pushed into the online portal 2916. The video processing system 2900 allows pre-analysis, segment sorting, assessment, output rendering and reconforming all to be carried out in or from the online portal 2916. In such embodiments, cloud security should be carefully considered and increased where possible, as both the video material and the integrated video material and advertising component would be contained within the online portal 2916, either of which may be desired by unauthorized third parties.

Figure 30:
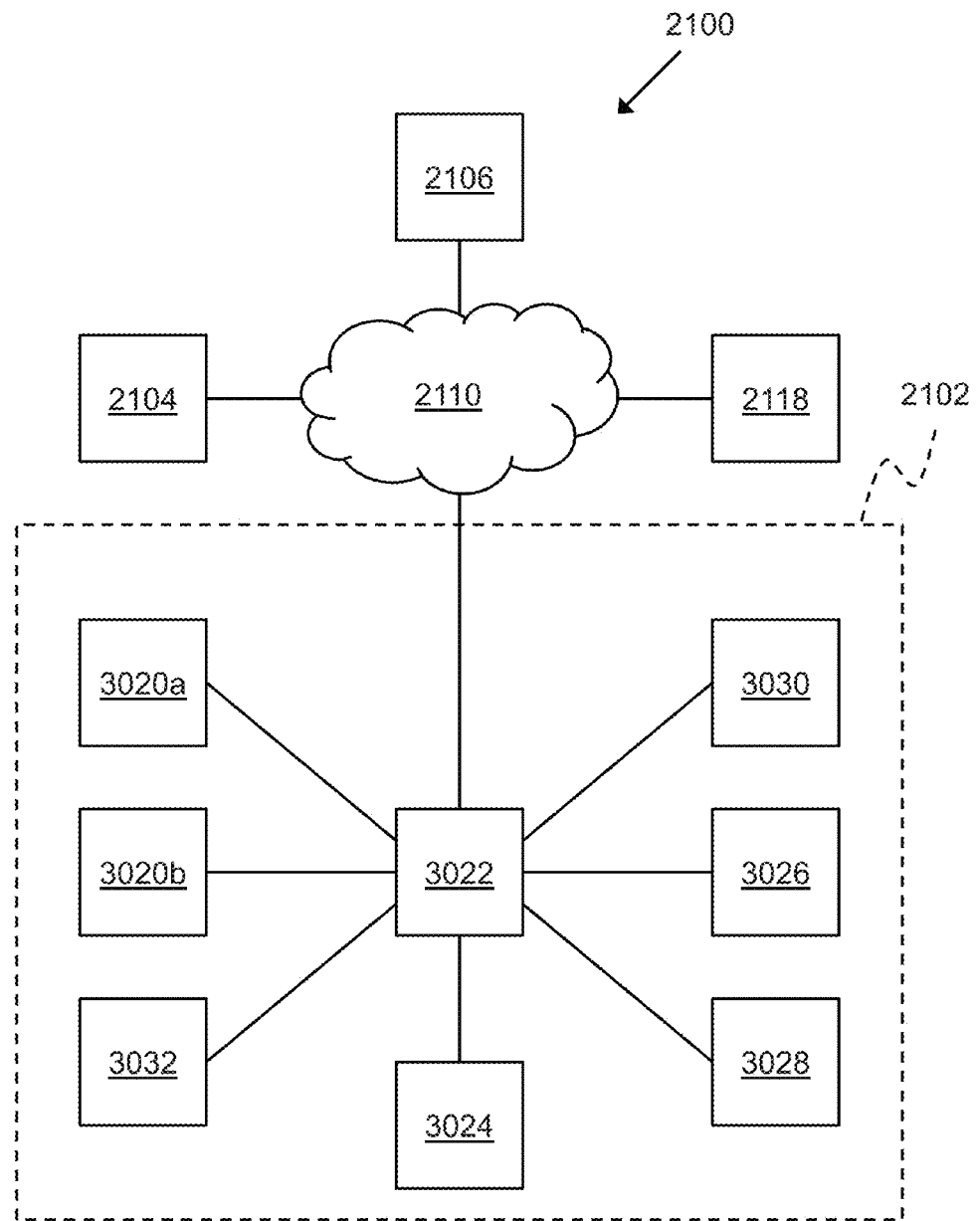
FIG. 30 is a schematic diagram showing a system in accordance with some embodiments.

FIG. 30 is a schematic diagram showing a system in accordance with some embodiments. In particular, FIG. 30 illustrates schematically various components of the source hub 2102.

In some embodiments, the components of the source hub 2102 are all located on a suitable subnet, on the same LAN. In some embodiments, the source hub connects to other hubs 2104, 2106, 2108 in the video processing system 2100 via a VPN.

The source hub 2102 comprises a plurality of workstations 3020*a*, 3020*b*. The workstations 3020*a*, 3020*b* are connected to a network switch 3022 via suitable connections, for example via 1 Gb Ethernet connections.

The source hub 2102 includes a cluster 3024 of high speed parallel processing graphics processing unit (GPU)-enabled computers for real-time video processing which are also connected to the switch 222 via suitable connections, for example via 1 Gb Ethernet connections.

The source hub 2102 includes primary and backup storage systems 1026, 3028. The storage systems 3026, 3028 store media and other data associated with projects that are processed in the video processing system 2100. The data storage systems 3026, 3028 may store retrieved video material, integrated video material and advertising component and other data such as metadata files (for example in XML format), video proxies, reports and assets used in processing video data. The data storage systems 3026, 3028 serve both the workstations 3020*a*, 3020*b* and the cluster 3024 and are connected to the switch 3022 via suitable connections, such as 140 Gb Ethernet connections.

The source hub 2102 includes a File Transfer Protocol (FTP) server 3030 for transferring files such as media files and associated files, which is also connected to the switch 3022 via a suitable connection, for example a 1 Gb Ethernet connection.

The source hub 2102 may include a media capture device 3032, such as a video tape recorder (VTR) 3032 for importing and exporting video material. The media capture device 3032 is connected to the switch 3022 via a suitable connection.

The switch 3022 is connected to the data communications network 2110 via a suitable connection which may include a VPN firewall to allow tunneling into the hub.

The above embodiments are to be understood as illustrative examples of the invention. Further embodiments of the invention are envisaged.

Embodiments have been described in which the creative hub 2104 receives the embed sequence from the source hub 2102 and creates push render instructions for the project associated with the embed sequence. However, embodiments are envisaged in which the video material retrieved by the creative hub 2104 is not the intermediate version and, indeed, embodiments relating to push render are not limited to receiving video data from a source hub 2102. In some embodiments, the video material could be retrieved from an entity outside the video processing system 2100, 2700, 2800, 2900 and the video material may not have been subject to the analysis, segment sorting and assessment described above.

Embodiments have been described above in which the creative hub 2104 comprises various creative modules 2104*a*, 2104*b*, 2104*c* which are used to analyses video material and to generate instructions for generating integrated video material and advertising component comprising the one or more advertising components. In some embodiments, the source hub 2102 may also comprise some or all such modules. The source hub 2102 may use such modules to create preview imagery that may be a closer resemblance to final result.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of presenting advertising opportunities to users of a digital advertising placement system, comprising:
 receiving sequences of video material from a video material source, the sequences of video material having been processed from original video material to select parts of the original video material which are suitable for placement of digital advertising components; and
 incorporating the received sequences of video material into an online catalog accessible to a plurality of users via a data communications network, the online catalog comprising a plurality sequences of video material, the online catalog allowing remote access to a user to identify one or more sequences which are of interest to an advertiser wishing to conduct digital advertising placement using said system, wherein the online catalog includes one or more metrics and a monetary value related to each of the plurality of video materials, wherein the one or more metrics are usable to automatically calculate the monetary value of a placement of a digital advertising component, wherein the metrics and the monetary value are determined before the digital advertising placement, wherein allowing remote access to the online catalog comprises providing an approval stage, wherein during the approval stage a plurality of users are invited to provide approval or rejection of a selected sequence of video material following identification of the one or more sequences of interest, the approval stage being complete only when each invited user has provided approval.

2. A method according to claim 1, wherein the sequences of video material received from a video material source comprise related sequences of video material.

3. A method according to claim 2, wherein the sequences of video material received from a video material source comprise sequences of video material selected from one broadcast video content item.

4. A method according to claim 1, comprising receiving and aggregating heterogeneous sequences of video material from a plurality of sources and incorporating said heterogeneous sequences into said online catalog.

5. A method according to claim 1, wherein the online catalog is searchable based on at least one of the following characteristic of the video material: genre, viewing figures, and characters appearing in the video material.

6. A method of claim 1, wherein the one or more metrics related to the video material comprise at least one of a length of selected parts of the video material which are suitable for placement of digital advertising components, a size of a placement zone, a duration of the video material, a predicted audience size, a predicted audience demographic, a number of placement zones, a total time of the placement zones within the video material, an average placement zone length, and an average episode placement zone length.

7. A method according to claim 1, wherein the online catalog includes one or more indicators for suitable placement zones, marked within the video material.

8. A method according to claim 1, wherein the received sequences of video material comprise an intermediate working version of the original video material.

9. A method according to claim 1, further comprising:
   associating metadata with the received sequences of video material; and
   utilizing said metadata to assign permission to review the relevant part of the online catalog.

10. A method according to claim 9, wherein said metadata identifies the video material source.

11. A method according to claim 9, wherein said metadata identifies a category of access.

12. A method according to claim 9, comprising receiving an identity of a user and permitting access to selected parts of the online catalog and preventing access to other parts of the online catalog, based on said user identity.

13. Apparatus for presenting advertising opportunities to users of a digital advertising placement system, comprising:
   one or more data communication interfaces receiving sequences of video material from a video material source, the sequences of video material having been processed from original video material to select parts of the original video material which are suitable for placement of digital advertising components,
   a data storage system incorporating the received sequences of video material into an online catalog accessible to a plurality of users via a data communications network, the online catalog including the received sequences of video material, wherein the online catalog includes one or more metrics and a monetary value related to each of the plurality of video materials, wherein the one or more metrics are usable to automatically calculate the monetary value of a placement of a digital advertising component, wherein the metrics and the monetary value are determined
   a server system allowing remote access to a user of the online catalog to identify one or more sequences which are of interest to an advertiser wishing to conduct digital advertising placement using said system, wherein allowing remote access to the online catalog comprises providing an approval stage, wherein during the approval stage a plurality of users are invited to provide approval or rejection of a selected sequence of video material following identification of the one or more sequences of interest and prior to transmission, the approval stage being complete only when each of the invited users have provided approval.

14. A method of presenting advertising opportunities to users of a digital advertising placement system, comprising:
   receiving, at a user system, one or more sequences of video material from an online catalog, the sequences of video material having been processed from original video material to select parts of the original video material which are suitable for placement of digital advertising components; and
   remotely accessing, by the user system, an online catalog on a server system, the online sequences including the received sequences of video material, and identifying one or more sequences which are of interest to an advertiser wishing to conduct digital advertising placement using said system, wherein the online catalog includes one or more metrics and a monetary value related to each of the plurality of video materials, wherein the one or more metrics are usable to automatically calculate the monetary value of a placement of a digital advertising component, wherein the metrics and the monetary value are determined, before the digital advertising placement,
   wherein remotely accessing the online catalog further comprises an approval stage, wherein during the approval stage a plurality of users are invited to provide approval or rejection of a selected sequence of video material following identification of the one or more sequences of interest, the approval stage being complete only when each of the invited users has provided approval.

15. A method according to claim 14, comprising transmitting an identity of the user and receiving access to only selected parts of the online catalog, based on said user identity.

16. A method according to claim 15, comprising receiving user input which specifies access credentials, said access credentials including said user identity.

17. The method according to claim 1, further comprising allowing filtering of the online catalog based on the one or more metrics after allowing remote access.

* * * * *